United States Patent
Kimura

(10) Patent No.: US 8,320,030 B2
(45) Date of Patent: Nov. 27, 2012

(54) STORING AND PROCESSING APPARATUS TO ENSURE DELIVERY AND STORAGE PERFORMANCE FOR RECORD MEMBER IRRESPECTIVE OF CHARACTERISTICS OF RECORD MEMBER, POST PROCESSING APPARATUS AND RECORD MEMBER PROCESSING APPARATUS RESPECTIVELY USING SUCH STORING AND PROCESSING APPARATUS FOR RECORD MEMBER

(75) Inventor: Masatoshi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 613 days.

(21) Appl. No.: 12/510,692

(22) Filed: Jul. 28, 2009

(65) Prior Publication Data

US 2010/0110510 A1 May 6, 2010

(30) Foreign Application Priority Data

Nov. 6, 2008 (JP) ................................ P2008-285777

(51) Int. Cl.
*H04N 1/04* (2006.01)
(52) U.S. Cl. ....... 358/498; 358/474; 358/1.15; 358/496; 271/207; 271/221; 270/58.12
(58) Field of Classification Search ............... 358/1, 15, 358/1.16, 401, 404, 496, 498, 488; 271/207, 271/221, 186; 270/58.12, 58.02, 58.09
See application file for complete search history.

(56) References Cited

U.S. PATENT DOCUMENTS

| | | | | |
|---|---|---|---|---|
| 5,010,365 A * | 4/1991 | Hatanaka | ...................... | 399/111 |
| 5,797,596 A * | 8/1998 | Morigami et al. | ......... | 270/58.11 |
| 6,356,719 B1 * | 3/2002 | Yoshiura | ........................ | 399/45 |
| 7,588,241 B2 * | 9/2009 | Murata et al. | .............. | 270/58.11 |
| 7,885,568 B2 * | 2/2011 | Higashi et al. | .................. | 399/69 |
| 7,896,334 B2 * | 3/2011 | Sugizaki | .................... | 270/58.12 |
| 7,984,899 B2 * | 7/2011 | Iguchi et al. | ............... | 270/58.11 |
| 7,997,569 B2 * | 8/2011 | Iguchi et al. | .................... | 270/37 |
| 8,096,543 B2 * | 1/2012 | Toyoizumi et al. | ........ | 270/58.07 |
| 8,145,108 B2 * | 3/2012 | Murakami et al. | ........... | 399/304 |
| 2006/0071410 A1 | 4/2006 | Koie | | |
| 2008/0101822 A1 * | 5/2008 | Sasaki | .......................... | 399/258 |
| 2010/0067952 A1 * | 3/2010 | Fujita et al. | .................. | 399/168 |
| 2011/0006468 A1 * | 1/2011 | Sugizaki | ................... | 270/58.12 |
| 2011/0221118 A1 * | 9/2011 | Kamichika | ................. | 271/4.12 |

FOREIGN PATENT DOCUMENTS

| | | |
|---|---|---|
| JP | 2003-292227 | 10/2003 |
| JP | 2006-069748 | 3/2006 |

* cited by examiner

*Primary Examiner* — Negussie Worku
(74) *Attorney, Agent, or Firm* — Morgan, Lewis & Bockius LLP

(57) ABSTRACT

A storing and processing apparatus for a record member includes: a record member storing portion that stores therein a record member being transported along the record member transport route; a moving unit that moves up or down the record member storing portion; a positioning and storing portion that temporarily positions and stores the record member; an arranging unit that stocks and arranges record members in the positioning and storing portion; a discharge member that discharges, from a discharge position, the record member existing on the record member transport route or on the positioning and storing portion toward the record member storing portion; a record member type determining unit and, a control unit that drives the moving unit to move up or down the record member storing portion.

10 Claims, 16 Drawing Sheets

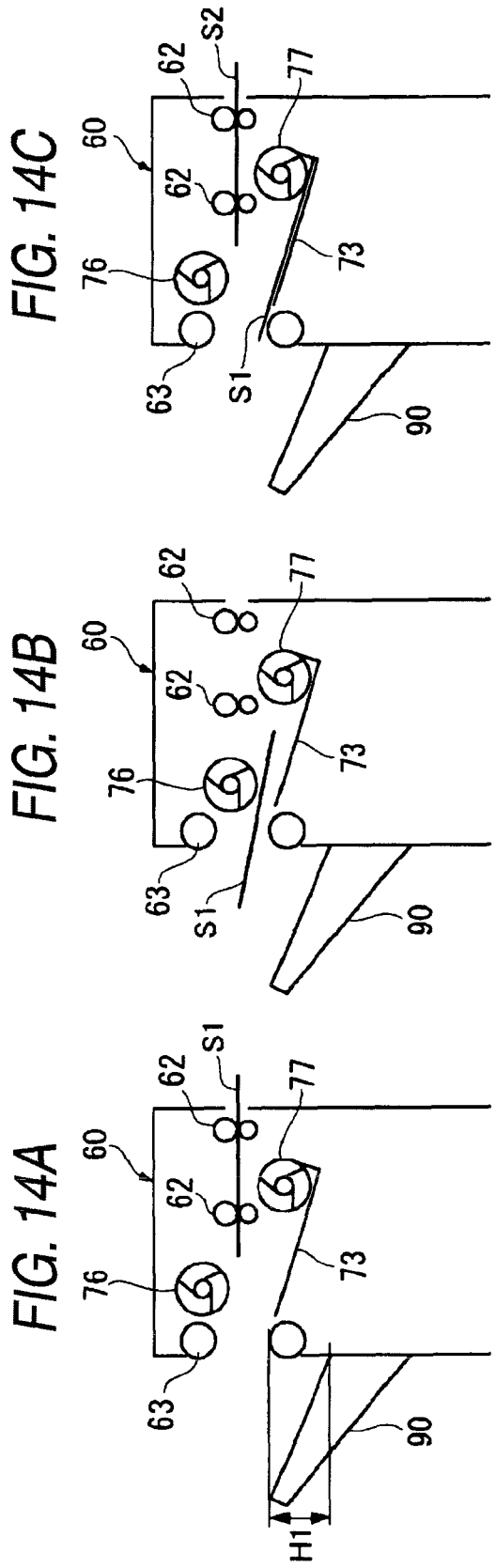

STORING AND PROCESSING APPARATUS TO ENSURE DELIVERY AND STORAGE PERFORMANCE FOR RECORD MEMBER IRRESPECTIVE OF CHARACTERISTICS OF RECORD MEMBER, POST PROCESSING APPARATUS AND RECORD MEMBER PROCESSING APPARATUS RESPECTIVELY USING SUCH STORING AND PROCESSING APPARATUS FOR RECORD MEMBER

CROSS-REFERENCE TO RELATED APPLICATION

This application is based on and claims priority under 35 USC 119 from Japanese Patent Application No. 2008-285777 filed Nov. 6, 2008.

BACKGROUND

Technical Field

The present invention relates to a storing and processing apparatus for a record member as well as a post processing apparatus and a record member processing apparatus respectively using such storing and processing apparatus for a record member.

SUMMARY

According to an aspect of the invention, a storing and processing apparatus for a record member includes: a record member transport route that transports a recording member; a record member storing portion that stores therein the record member being transported along the record member transport route; a moving unit that moves up or down the record member storing portion; a positioning and storing portion that temporarily positions and stores the record member being transported along the record member transport route before the record member storing portion; an arranging unit that stacks and arranges record members in the positioning and storing portion; a discharge member that discharges, from a discharge position, the record member existing on the record member transport route or on the positioning and storing portion toward the record member storing portion; a record member type determining unit that determines whether a record member being transported along the record member transport route is an ordinary record member having a weight or a thickness of a reference value or less, or a specific record member having a weight or a thickness of a value exceeding the reference value; and, a control unit which, when the record member type determining unit determines that the record member is the ordinary record member, drives the moving unit to move up or down the record member storing portion to be set at an ordinary storage position lower than the discharge position of the record member to be discharged by the discharge member and, after one or more record members is or are arranged in the positioning and storing portion by the arranging unit, drives the discharge member to discharge the record member(s) existing on the positioning and storing portion toward the record member storing portion, whereas, when the record member type determining unit determines that the record member is the specific record member, drives the moving unit to move up or down the record member storing portion to be set at a specific storage position lower than the ordinary storage position and thereafter drives the discharge member to discharge the record members being transported along the record member transport route toward the record member storing portion without storing the record member in the positioning and storing portion.

BRIEF DESCRIPTION OF THE DRAWINGS

Embodiments of the invention will be described in detail based on the following figures, wherein:

FIGS. 14A~14F are respectively explanatory views of states in which an ordinary record member is discharged to the stack tray;

DETAILED DESCRIPTION

Firstly, description will be given below of the summary of an exemplary embodiment according to the invention.

Summary of the Exemplary Embodiment Model

Figure 1:
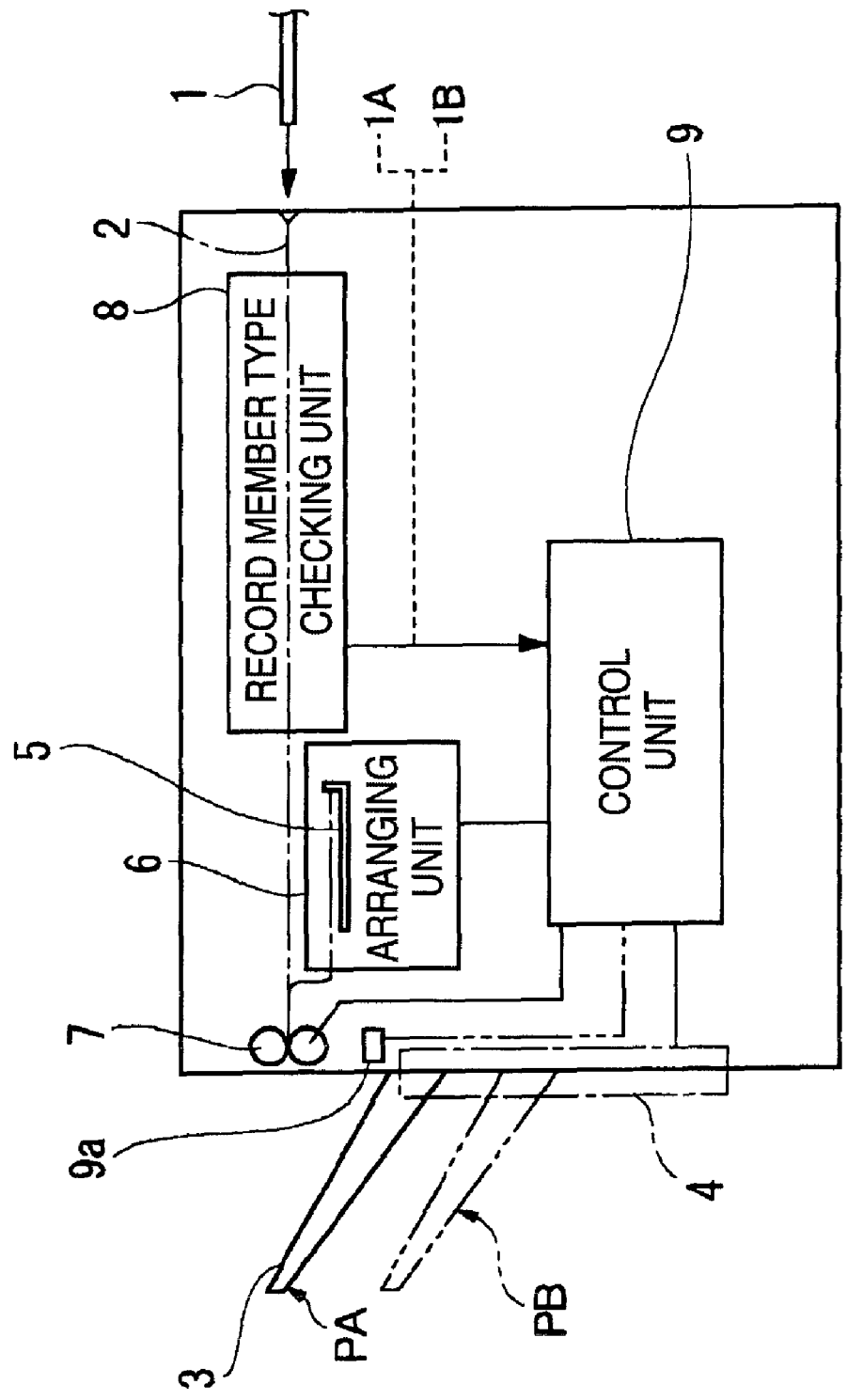
FIG. 1 is an explanatory view of the summary of a storing and processing apparatus for a record member according to the present exemplary embodiment model.

FIG. 1 is shows the summary of a storing and processing apparatus for a record member according to a typical model of an exemplary embodiment for enforcing the invention. In FIG. 1, the storing and processing apparatus for the record member includes: a record member storing portion 3 for storing therein record members 1 being transported along a record member transport passage 2; a moving unit 4 for moving up or down the record member storing portion 3; a positioning and storing portion 5 for temporarily positioning and storing the record members 1 being transported along the record member transport passage 2 before the record member storing portion 3; an arranging unit 6 for superimposing and arranging the record members 1 in the positioning and storing portion 5; a discharge member 7 for discharging the record members 1 existing in the record member transport passage 2 or positioning and storing portion 5 toward the record member storing portion 3; a record member type determining unit 8 for determining whether the record members 1 being transported along the record member transport passage 2 are an ordinary record member 1A, the weight or thickness per unit area of which is a previously set reference value or less, or a specific record member 1B the weight or thickness per unit area of which is larger than the reference value; and, a control unit 9 structured in the following manner. That is, when the record member type determining unit 8 determines that the record members 1 are the ordinary members 1A, the control unit 9 drives the moving unit 4 to move and set the record member storing portion 3 to a previously set ordinary storage position PA lower than a record member discharge position where the record members are to be discharged by the discharge member 7, and, after it drives the arranging unit 6 to arrange one or multiple record members 1 (1A) in the positioning and storing portion 5, drives the discharge member 7 to discharge the record members 1 in the positioning and storing portion 5 toward the record member storing portion 3; and, when the record member type determining unit 8 determines that the record members 1 are the specific members 1B, the control unit 9 drives the moving unit 4 to move and set the record member storing portion 3 to a previously set specific storage position PB lower than the ordinary storage position PA, and drives the discharge member 7 to discharge the record members 1 being transported along the record member transport passage 2 one by one toward the record member storing portion 3 not through the positioning and storing portion 5.

Here, the record member type determining unit 8 may be structured such that it can determine whether the record member 1 is the ordinary record member 1A or the specific record member 1B according to the reference value previously set for the weight per unit area of the record member 1 (for example, a value equivalent to the basic weight of the record member 1) or for the thickness of the record member 1. In this case, the reference value may be based on information about the weight per unit area of the record member 1 or about the thickness thereof, that is, may be based on the weight or thickness; or, it may be based on information including two pieces of information about the weight and thickness; and further, when the two pieces of information are used, one of them may have priority over the other. Generally, as such reference value, there is set a value according to which the record member 1 to be used ordinarily may be the ordinary record member 1A.

Also, to determine the record member 1 for the type thereof, the record member 1 may be determined directly; or, the type of the record member 1 may be determined according to information about the type of the record member 1 obtained from another apparatus. Further, an operator may manually input information about the fact that the record member 1 is the ordinary record member 1A or specific record member 1B. Still further, the record member 1 may be any record member, provided that it can be determined as to whether it is the ordinary record member 1A or specific record member 1B; and, the specific record members 1B may also be ramified to multiple types.

Also, the storage position of the record member 1 does not mean the position of the record member storing portion 3 but it means the position of a storing surface onto which the record member 1 is stored when it is stored into the record storing portion 3. For example, when the record members 1 are carried on the record member storing portion 3, the storage position is the position that corresponds to the top or upper surface of the upper-most one of the record members carried on. Further, for the storage position of the record member storing portion 3, it may include the ordinary storage position PA at which the ordinary record members 1A can be stored and the specific storage position PB lower than the ordinary storage position PA; and, the specific record members 1B may also be ramified and the thus-obtained multiple specific storage positions PB may be set respectively lower than the ordinary storage position PA.

Figure 2A:
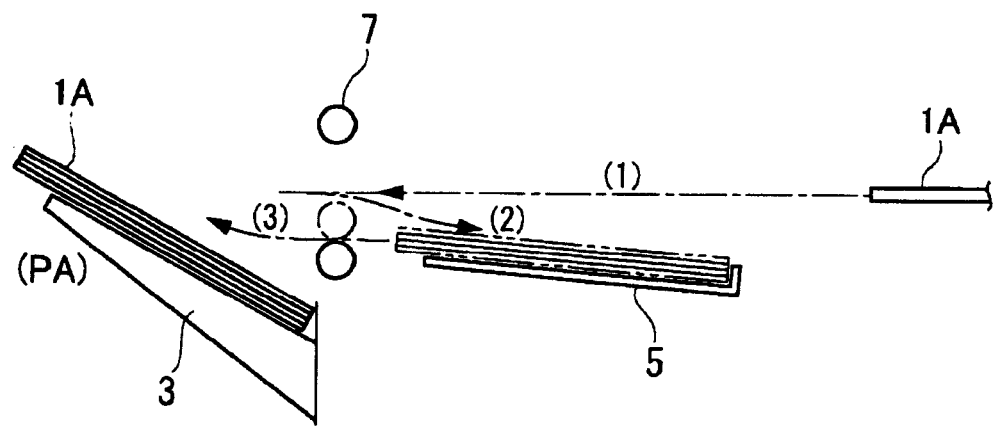
FIG. 2A is an explanatory view of a state in which a record member is transported to a record member storing portion according to the types of record members in the storing and processing apparatus for the record member, in a case where a record member to be transported is an ordinary record member.
Figure 2B:
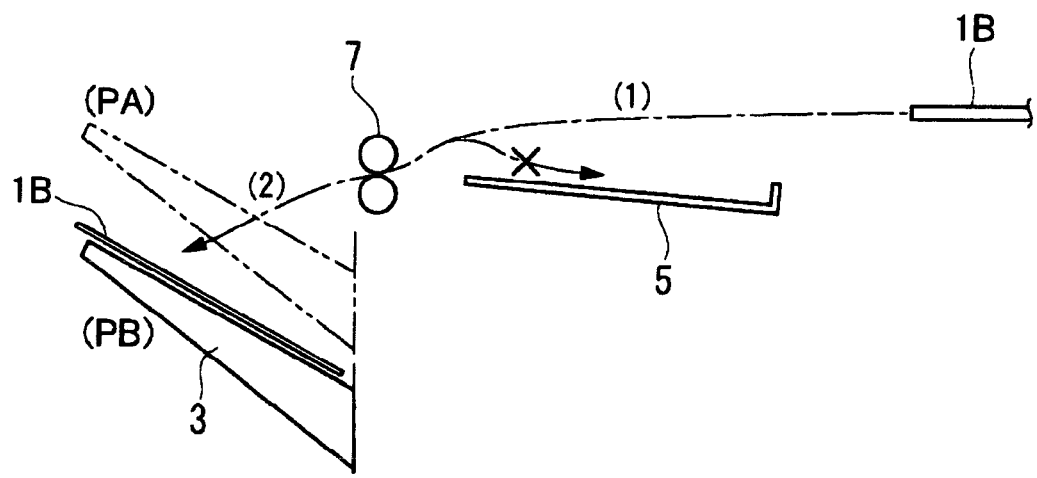
FIG. 2B is an explanatory view of a state in which a record member is transported to a record member storing portion according to the types of record members in the storing and processing apparatus for the record member, in a case where a record member to be transported is a specific record member.

FIGS. 2A-2B are explanatory views of the state of conveyance of the record members 1 when the ordinary record members 1A and specific record members 1B are stored into the record member storing portion 3. Specifically, FIG. 2A shows the transporting state of the ordinary record members 1A, while FIG. 2B shows that of the specific record members 1B.

For the ordinary record members 1A, as shown in FIG. 2A, firstly, the ordinary record members 1A transported as shown by (1) are switched back once as shown by (2) toward the positioning and storing portion 5, and are arranged by the positioning and storing portion 5; and, the bundle of the thus arranged record members is discharged as shown by (3) from the discharge member 7 toward the record member storing portion 3 set at the ordinary storage position PA near to the discharge member 7. On the other hand, for the specific record members 1B, as shown in FIG. 2B, firstly, the specific record member 1B are transported as shown by (1) toward the discharge member 7 and then, as shown by (2), they are discharged as they are from the discharge member 7 toward the record member storing portion 3 set at the specific storage position PB lower than the ordinary storage position PA. In this case, unlike the ordinary record members 1A, the specific record members 1B are not switched back to the positioning and storing portion 5. In other words, for the ordinary record members 1A, the arranged record members 1 are stored as they are into the record member storing portion 3; and, for the specific record members 1B, the record members 1 are stored one by one into the record member storing portion 3 without being switched back.

Also, as shown in FIG. 1, from the viewpoint of the fact that the storage positions of the record members 1 are adjusted properly to the properties of the record members 1, the control unit 9 may include an ordinary position detector 9a capable of detecting the ordinary storage position PA and may move and set the ordinary storage position PA of the record member storing portion 3 according to information given from the ordinary position detector 9a. That is, a position, which can be detected by the ordinary position detector 9a, may be regarded as the ordinary storage position PA and, for the specific record members 1B, the record member storing portion 3 may be moved down by a previously set amount from the ordinary storage position PA that is detected by the ordinary position detector 9a.

Further, from the viewpoint of the fact that the ordinary storage position PA can be detected properly free from the deformation or the like of the record member 1, the ordinary position detector 9a may include a hold member for holding down the record member storing portion 3 set at the ordinary storage position PA or the record member 1 stored on the record member storing portion 3, and a detecting portion for detecting the attitude of the hold member. According to this structure, even when the record member 1 stored in the record member storing portion 3 is deformed or the like, the top surface of the record member 1 can be detected correctly by the hold member, which makes it possible to move up or down the position of the record member storing portion 3 to set it properly. Here, assuming that, as the ordinary position detector 9a, for example, there is used a device of an optical detection system, there is raised a fear that, when the record member 1 stored in the record member storing portion 3 is deformed, the top surface of the record member 1 cannot be detected correctly. Of course, in order to be able to prevent the hold member from interfering with the storing operation of the record member 1, the hold member is structured such that it can be retreated when the record member 1 is stored into the record member storing portion 3.

Also, from the viewpoint of the fact that the ordinary storage position PA for storing the ordinary record member 1A and the specific storage position PB for storing the specific record member 1B can be detected respectively, the control unit 9 may further include a specific position detector capable of detecting the specific storage position PB; and, information from the ordinary position detector 9a may have priority over information from the specific position detector. According to this structure, both of the ordinary record member 1A and specific record member 1B can be stored properly into the record member storing portion 3. Here, "to have priority" may mean to ignore the information from the specific position detector, or may mean to issue information in a state where the specific position detector is itself not in effective operation. For the latter case, for example, as a detect system, there is used an optical system; and, the light for the specific position detector can be blocked by the record member storing portion 3 and the ordinary record member 1A stored in the record member storing portion 3. Here, the position detecting operation may also be carried out simply electrically.

And, from the viewpoint of enhancing the visual confirmation of the ordinary record members 1A stacked and stored in the record member storing portion 3, the arranging unit 6 may include a pair of arranging members for tapping and arranging together the width-direction end faces of the record members 1 existing in the positioning and storing portion 5, the end faces intersecting with each other in the transporting direction of the record members; and, the pair of adjusting members may be structured such that one of them is used as a reference position in the width direction. When the reference arranging member is switched to arrange the record members 1, the record members 1 existing on the positioning and storing portion 5 can be arranged at different offset positions along the width direction thereof. In this case, one of the arranging members serving as the reference member may also be switched over to the other alternately, or may be switched in previously set order.

Further, from the viewpoint of reducing the size of the structure of the apparatus, the arranging unit 6 may include an extension storing portion which, when arranging the record members 1, can advance toward the record storing portion 3 and can position and store the record members 1 together with the positioning and storing portion 5. Owing to provision of such extension storing portion, in the arranging operation to be executed by the arranging unit 6, even the area that exists on the record member storing portion 3 can also be used as the area for positioning and storing the record members 1 and, by an amount equivalent to this, the size of the positioning and storing portion 5 itself can be reduced.

Also, from the viewpoint of quickly discharging the record members 1 by the discharge member 7 to the record member storing portion 3, there may be employed a structure which includes the following composing elements. That is, a record member storing portion 3 for storing therein record members 1 which are transported along a record member transport route 2; a moving unit 4 for moving up or down the record member storing portion 3; a positioning and storing portion 5 for temporarily positioning and storing therein the record members 1 being transported along the record member transport passage 2 before the record member storing portion 3; an arranging unit 6 for stacking and arranging together the record members 1 in the positioning and storing portion 5; a discharge member 7 for discharging the record members 1 existing on the record member transport route 2 or on the positioning and storing portion 5 toward the record member storing portion 3; a record member type determining unit 8 for determining whether the record member 1 being transported along the record member transport route 2 is an ordinary record member 1A, the weight per unit area or the thickness of which is equal to a previously set reference value or less, or a specific record member 1B having a weight per unit area or thickness exceeding the reference value; and, a control unit 9 structured in the following manner. That is, when the record member type determining unit 8 determines that the record members 1 are the ordinary members 1A, the control unit 9 drives the moving unit 4 to move up or down and set the record member storing portion 3 to a previously set ordinary storage position PA lower than a record member discharge position where the record members are to be discharged by the discharge member 7, and further, when the number of the ordinary record members 1A being transported sequentially along the record member transport route 2 is equal to a predetermined number or more, after it drives the arranging unit 6 to arrange one or multiple record members 1 (1A) in the positioning and storing portion 5, it drives the discharge member 7 to discharge the record members 1 existing on the positioning and storing portion 5 toward the record member storing portion 3; and, on the other hand, when the number is less than the predetermined number, it drives the discharge member 7 to discharge the record members 1 being transported along the record member transport route 2 one by one toward the record member storing portion 3 not through the positioning and storing portion 5. Also, when the record member type determining unit 8 determines that the record members 1 are the specific members 1B, the control unit 9 drives the moving unit 4 to move up or down and set the record member storing portion 3 to a previously set specific storage position PB lower than the ordinary storage position PA, and drives the discharge member 7 to discharge the record members 1 being transported along the record member transport route 2 one by one toward the record member storing portion 3 not through the positioning and storing portion 5.

And, according to the invention, it is also possible to provide a post processing apparatus which, in addition to the above-structured storing and processing apparatus for the record member, includes a post processing portion used to carry out a post processing such as a binding processing on the record members 1. In this case, the above-mentioned storing and processing apparatus for the record member may be structured such that it further includes a post processing portion which is disposed in correspondence to the record member transport route 2 or positioning and storing portion 5 and is also used to carry out a post processing on one or multiple record members 1 being transported along the record member transport route 2.

Also, such post processing apparatus may be combined with an image forming apparatus to thereby form a record member processing apparatus. In this case, the record member processing apparatus may include an image forming apparatus having an image forming portion for forming images on the record members 1, and the above-mentioned post processing apparatus.

Further, from the viewpoint of facilitating the determination of the specific record member 1B in the record member processing apparatus, the image forming portion may include a fixing device for fixing the record members by heating, and the record member type determining unit 8 may be structured such that, when the fixing condition of the fixing device is different from the condition of the ordinary record member 1A ordinarily used, it determines that the record member is the specific record member 1B. When the fixing condition is different from the condition of the ordinary record member 1A in this manner, there is a fear that, depending on the fixing condition, the record member 1 is easy to be larger, for example, in the curled amount thereof, than the ordinary record member 1A and a state different in the transport performance from the ordinary record 1A is easy to be generated. This makes it necessary to pay attention to the storing performance of the record member 1 into the record member storing portion 3. However, use of the above-mentioned storing and processing apparatus for the record member can secure the stable storing performance.

Now, description will be given below in detail of the invention with reference to an exemplary embodiment shown in the accompanying drawings.

Exemplary Embodiment 1

Figure 3:
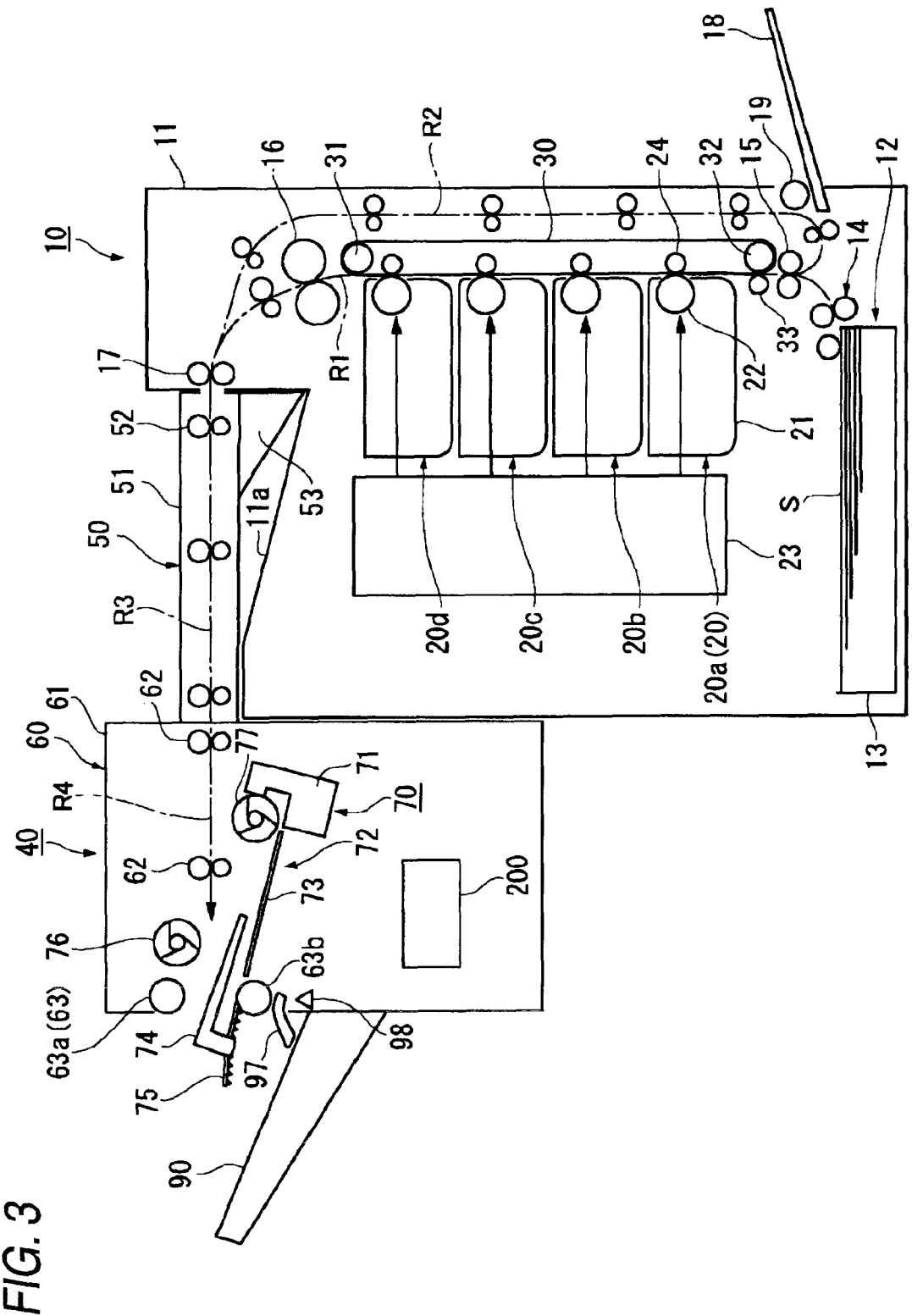
FIG. 3 is an explanatory view of the summary of a record member processing apparatus according to an exemplary embodiment 1.

FIG. 3 shows an exemplary embodiment 1 of a record member processing apparatus to which the above-mentioned exemplary embodiment model is applied. In FIG. 3, the record member processing apparatus includes a color image forming apparatus 10 of a so called tandem type and a post processing apparatus 40 mounted on the color image forming apparatus 10 to which the record members discharged from the color image forming apparatus 10 are discharged and stored.

The image forming apparatus 10 includes, within an apparatus box body 11, four image forming units 20 (specifically, 20a~20d) for four colors (for example, yellow, magenta, cyan and black) arranged in the vertical direction of the apparatus box body 11, and a record member supply portion 12 disposed downwardly of the image forming units 20 and storing therein record members S for supply; and, in the portions of the apparatus box body 11 that respectively correspond to the four image forming units 20, there are formed transport routes disposed substantially in the vertical direction of the apparatus box body 11 for transporting the record members S supplied from the record member supply portion 12.

The image forming units 20 are used to form toner images for colors such as yellow, magenta, cyan and black on the record members S sequentially from the upstream side along the transporting direction of the record members S; and, each image forming unit 20 includes a process cartridge 21 with various process units incorporated therein, and an exposure device 23 for radiating a scanning light for image formation onto the process cartridge 21. The process cartridge 21 includes, in the interior portion thereof, a sensitive member 22 and various devices, for example, a charging device for charging the sensitive member 22, a developing device for visualizing an electrostatic latent image formed on the sensitive member 22 charged by an exposure device 23 provided externally of the process cartridge 21 using a color toner corresponding to the electrostatic latent image, and a cleaning device for cleaning a residual toner remaining on the sensitive member 22. Here, in the present embodiment, a single exposure device 23 is used to expose the four image forming units 20a~20d to the light. However, the image forming units may also include their exclusive exposure devices.

Also, according to the present exemplary embodiment, in such portions of the respective image forming units 20 that correspond to the sensitive members 22, there is disposed a record member transport belt 30 so arranged as to extend over the four image forming units 20. This record member transport belt 30 is provided between and over two carry rollers 31 and 32 and it can be circulatingly rotated in such a manner that, for example, the carry roller 31 is used as a drive roller. And, at positions which are opposed to the respective sensitive members 22, on the back surface side of the record member transport belt 30, there are disposed transfer devices 24 which are used to transfer toner images formed on the respective sensitive members 22 onto the record members S being transported by the record member transport belt 30.

A record member transport system employed in the image forming apparatus 10 according to the present exemplary embodiment includes: an ordinary transport route R1 through which the record members S supplied from the record member supply portion 12 can be transported upwardly along the upper surface of the record member transport belt 30 to two discharge rollers 17 provided near to the exit of the apparatus box body 11; and, a return transport route R2 through which the record members S held by and between the two discharge rollers 17 can be returned to the ordinary transport route R1 through a different transport route from the ordinary transport route R1 due to the reversing operation of the discharge rollers 17. The record member supply portion 12 includes a send-out mechanism 14 which sends out the record members S from a storage container 13 and transports one of the record members S toward the downstream side. That is, a single record member S can be transported to the ordinary transport route R1 by this send-out mechanism 14.

In the ordinary transport route R1, there are provided resist rollers 15 which, after, on the more downstream side of record member transport direction than the send-out mechanism 14, the record member S is positioned on the more upstream side than the record member transport belt 30, are used to transport the record member S toward the downstream side at a given timing. Also, at positions which are opposed to the carry rollers 32 with the record member transport belt 30 between them, there are provided charging devices 33 which charge the record member S to thereby attach it to the record member transport belt 30. And, on the more downstream side of the most-downstream image forming unit 20d, there are provided fixing devices 16 which can fix the toner images of the record member S transported on the record member transport belt 30 and detached from the record member transport belt 30 by a detaching member (not shown). The fixing device 16 according to the present exemplary embodiment is structured such that, at least, it heats the toner images to thereby fix them; for example, by using a heating roller and a pressurizing roller, there can be applied sufficient heat and pressure.

To form a toner image further on the back surface side of the record member S transported through such ordinary transport route R1, the record member S may be returned once to the return transport route R2 and then the respective steps starting from the resist rollers 15 may be carried out repeatedly. Here, in the ordinary transport route R1 and return transport route R2, there are provided a proper number of transport members (transport roller and guide member), which are used to transport the record members S, and switching members.

Further, according to the present exemplary embodiment, there is provided a manually feeding mechanism 18 which is used to carry a manually feeding record member into a portion of the return transport route R2, whereby a manually feeding record member in the manually feeding mechanism 18 can be sent out therefrom by a send-out roller 19 and can be then transported to the resist rollers 15 through the return transport route R2.

Also, on the upper surface of the apparatus box body 11 of the image forming apparatus 10, there is formed a record member storing portion 11a for storing a record member which is discharged from the discharge rollers 17. According to the present exemplary embodiment, the post processing apparatus 40 is mounted in such a manner that it passes through above the record member storing portion 11a and extends laterally over the apparatus box body 11; and thus, in this case, the record member storing portion 11a formed on the image forming apparatus 10 side is not used.

The post processing apparatus 40 according to the present exemplary embodiment includes a horizontal transport portion 50 disposed upwardly of the record member storing portion 11a of the image forming apparatus 10, and a post processing main body portion 60 which is connected to the horizontal transport portion 50 and can be mounted on the lateral side of the image forming apparatus 10 by a connecting member (not shown).

The horizontal transport portion 50 includes multiple transport rollers 52 disposed within a horizontal box body 51 for transporting a record member, whereby a record member S discharged from the discharge rollers 17 of the image forming apparatus 10 can be transported toward the post processing main body portion 60 along a horizontal transport route R3. Also, on the discharge roller 17 side of the horizontal box body 51, there is disposed a substantially triangle-shaped positioning piece 53 which is used to position the horizontal transport portion 50 with respect to the record member storing portion 11a.

The post processing main body portion 60 includes a proper number of transport rollers 62 which are used to transport a record member carried into a main body box body 61 along a transport route R4. And, in the portions of the post processing main body portion 60 that exist downstream of the transport route R4 and near to the end portion of the main body box body 61, there are provided discharge rollers 63 (specifically, 63a and 63b) each including a pair of roller members which can be contacted with each other and can be detached from each other. Specifically, the upper roller member 63a is moved up and down with respect to the lower roller member 63b, whereby the discharge rollers 63 can be contacted with each other and can be detached from each other. Further, within the main body box body 61, there is provided an end binding device 70 which serves as a post processing portion. Specifically, the end binding device 70 carries out an end binding processing on multiple record members which are superimposed on top of each other.

The end binding device 70 according to the present exemplary embodiment includes a binding member 71 for binding together the near-to-one-side portions of the record members superimposed, and an arranging mechanism 72 for arranging the record members before they are bound by the binding member 71. The arranging mechanism 72 includes an arranging tray 73 serving as a positioning and storing portion for positioning and storing the record member S, a pair of tampers serving as arranging members for tapping the width-direction (which intersects with the record member transport direction) portions of the record members on the arranging tray 73 to thereby arrange the width-direction portions of the record members, an extension storing portion 75 serving as the extension portion of the arranging tray 73 which, as the need arises, can advance outwardly from the main body box body 61 to position and store the record member in cooperation with the arranging tray 73, a first paddle 76 which, as the need arises, can be moved down toward the arranging tray 73 to move the record member transported through the transport route R4 in the opposite direction to the transport direction, a second paddle 77 for moving the record member on the arranging tray 73 moved by the first paddle 76 in the direction of the binding member 71, and the like.

Further, outside the main body box body 61, there is provided a stack tray 90 serving as a record member storing portion for storing therein the record member carried into the post processing main body portion 60 and discharged from the discharge rollers 63; and, the stack tray 90 can be moved in the vertical direction by a moving mechanism 91 which will be discussed later. Also, reference numeral 97 shown in FIG. 3 designates a set clamp serving as a hold member which, in order to detect the storage position of the stack tray 90, holds the upper surface of the stack tray 90 or the record members stored on the stack tray 90. And, reference numeral 98 designates an ordinary position detector for detecting the position of the set clamp 97. In the present exemplary embodiment, the set clamp 97 and ordinary position detector 98 cooperate together in constituting an ordinary position detect unit.

Still further, within the main body box body 61, there is provided a control unit 200 which is used to control the arranging mechanism 72, moving mechanism 91, discharge rollers 63 and the like.

Figure 4:
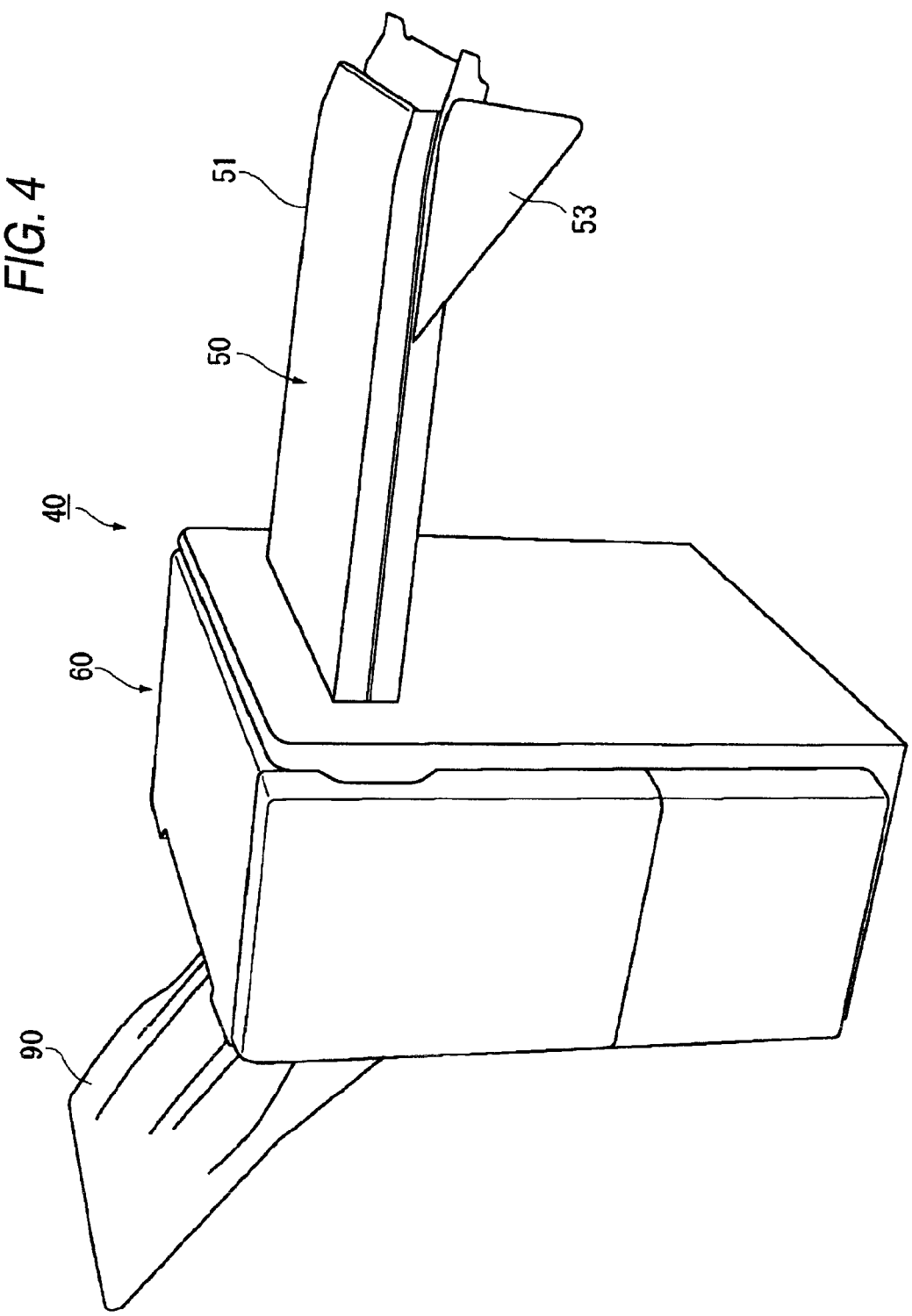
FIG. 4 is a perspective view of the appearance of a post processing apparatus.

FIG. 4 is a perspective view of the post processing apparatus 40, in which the horizontal transport portion 50 is structured such that the upper side of the horizontal box body 51 can be opened upwardly. Thus, since the horizontal transport route R3 existing internally of the horizontal transport portion 50 can be opened, even when the horizontal transport route R3 is clogged with a record member, the clogged state can be removed easily.

Figure 5:
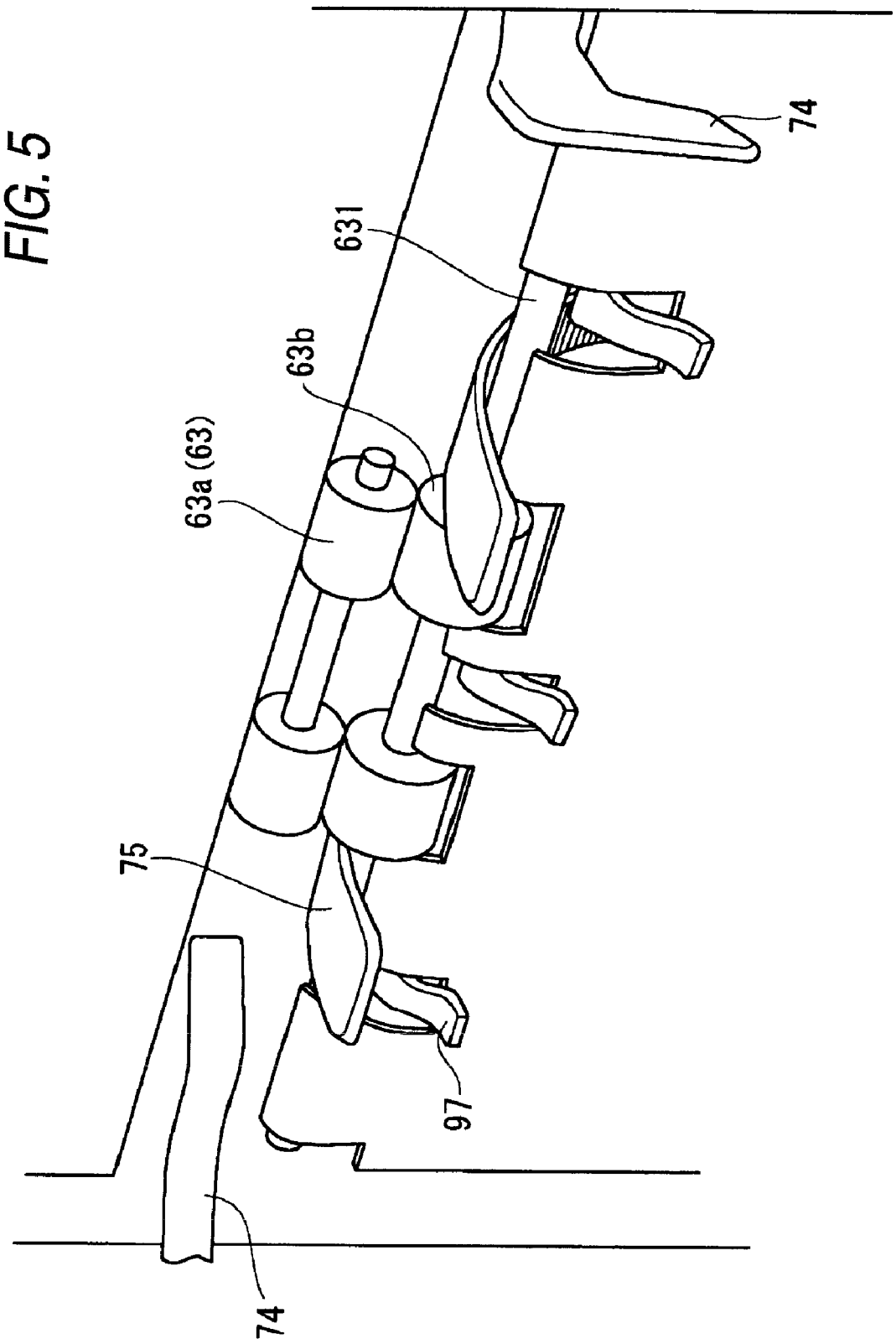
FIG. 5 is a partially perspective view of the post processing apparatus when it is viewed from the record member discharge side thereof.

Also, FIG. 5 is a substantially perspective view of the post processing main body portion 60 of the post processing apparatus 40, when it is viewed from the stack tray 90 side. While the discharge rollers 63 are disposed to correspond to the opening portion of the main body box body 61, FIG. 5 shows a state where the upper roller member 63a is moved down toward the lower roller member 63b, that is, a state where the discharge rollers 63 are nipping at each other. Therefore, the upper roller member 63a, as the need arises, can be moved upwardly from this position.

Further, in the neighboring portion of the rotation shaft 631 of the lower roller member 63b of the discharge rollers 63, there are disposed the extension storing portion 75 (in the present exemplary embodiment, it is disposed at two places) constituting a portion of the arranging mechanism 72, and the set clamp 97 (in the present exemplary embodiment, it is disposed at three places) used to control the vertically moving position of the stack tray 90, while both of the extension storing portion 75 and set clamp 97 can be advanced from the main body box body 61 toward the stack tray 90. Also, in the near-to-two-end portions of the rotation shaft 631 of the lower roller member 63b, there are disposed the pair of tampers 74 serving as the arranging mechanism 72. In this embodiment, the tampers 74 are disposed such that they project long from the main body box body 61 toward the stack tray 90. Owing to this structure, of the record members positioned on the arranging tray 73 and extension storing portion 75, the near-to-outside portions thereof can be tapped and arranged, thereby being able to reduce the size of the arranging tray 73 accordingly. This makes it possible to reduce the size of the whole of the post processing apparatus 40.

Figure 6:
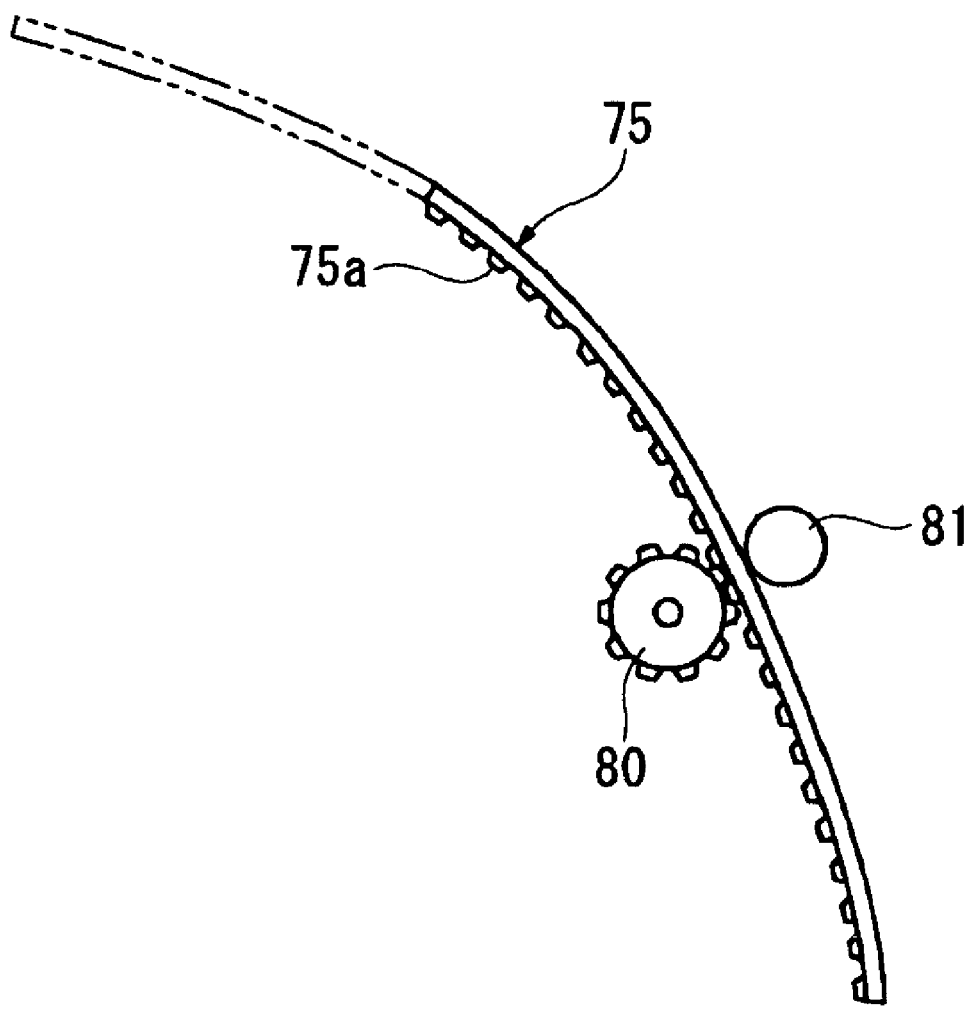
FIG. 6 is an explanatory view of an extension storing portion.

Next, description will be given below of the extension storing portion 75. The extension storing portion 75, when arranging the record members, can be advanced outwardly from the main body box body 61 and thus, when the extension storing portion 75 in such advanced state is driven to function as a portion of the arranging tray 73, even the record member long in the transport direction can also be positioned and stored properly. Therefore, the extension storing portion 75 is structured such that it can be advanced from the main body box body 61 toward the stack tray 90 at a previously set timing. As shown in FIG. 6, the extension storing portion 75 includes a rack 75a on the back surface side thereof, while the main body box body 61 includes a pinion gear 80 and a rubber roller 81 at a given position with the extension storing portion 75 between them; and, the rack 75a of the extension storing portion 75 is always in meshing engagement with the pinion gear 80. Owing to this structure, as the rack 75a is moved due to the rotation of the pinion gear 80, the extension storing portion 75 can be advanced from the main body box body 61 or can be stored into the main body box body 61.

Figure 7A:
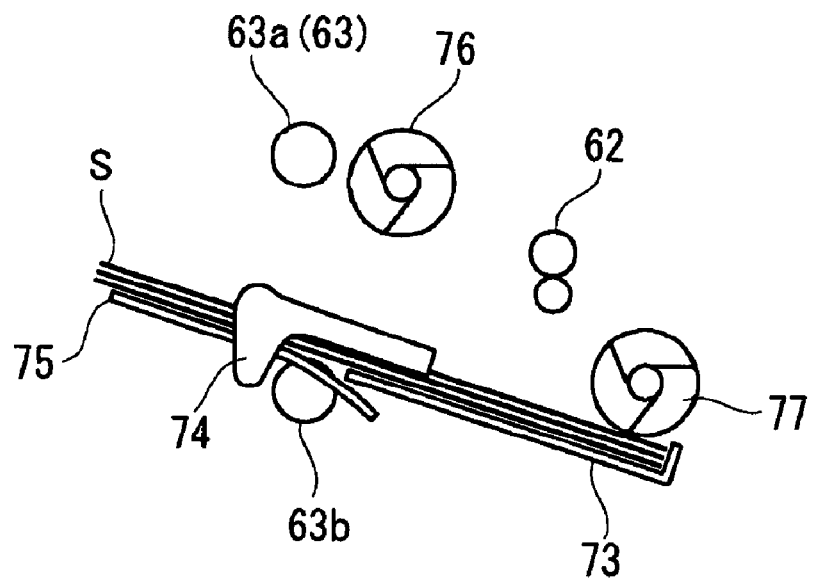
FIG. 7A is a typical view of a mechanism for arranging record members using tampers.
Figure 7B:
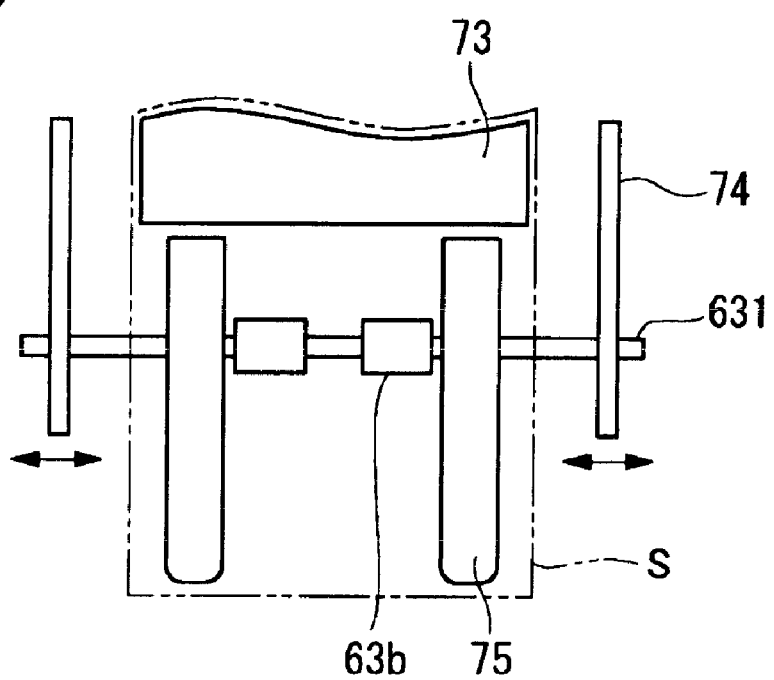
FIG. 7B is a viewed from above a mechanism for arranging record members using tampers.

Using the thus structured extension storing portion 75, the width-direction portions of the record members on the arranging tray 73 and extension storing portion 75 can be arranged by the tampers 74. FIG. 7A shows a state where the record members S are arranged by the tampers 74 on the arranging tray 73 and extension storing portion 75, while FIG. 7B is a typical view when FIG. 7A is viewed from above. The tampers 74 are disposed externally of the arranging tray 73 and extension storing portion 75, whereby, for example, by moving racks (not shown) provided on the tampers 74 using a motor and a pinion gear (neither of which is shown), the tampers 74 can be moved reciprocatingly in the direction of arrows shown in FIG. 7B. Therefore, the width-direction portions of the record members S, which have been transported onto the arranging tray 73 one by one, can be arranged one by one by the tampers 74. In FIG. 7B, there is shown a state where the record members S are arranged in the central portion by the tampers 74. However, according to the present embodiment, with one of the tampers 74 as the reference, the record members S can be moved to one side and thus the present embodiment has a so called offset function which, by switching the tamper 74 serving as the reference, can arrange the record members S at offset positions respectively. Here, although the present embodiment illustrates a structure which uses the extension storing portion 75, of course, it is also possible to employ a structure which does not take the size of the post processing apparatus into consideration but, for example, increases the size of the arranging tray 73 and excludes the extension storing portion 75.

Figure 8:
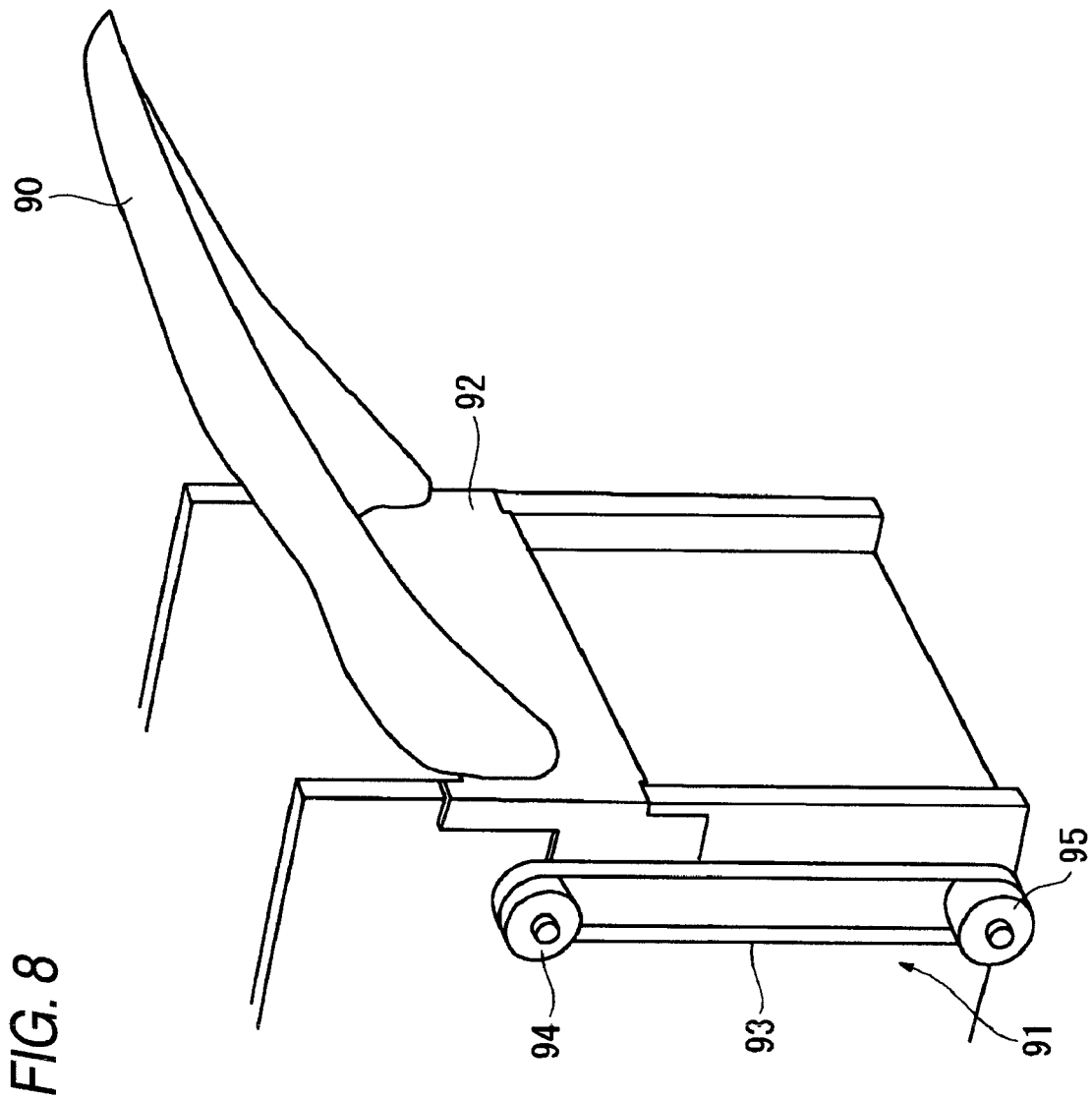
FIG. 8 is an explanatory view of a moving mechanism.

Also, the moving mechanism 91 is structured in the following manner. That is, as shown in FIG. 8, one end side of a support plate 92 for supporting the stack tray 90 is fixed to a belt 93, and the belt 93 is extended on and between two pulleys 94 and 95 respectively disposed in the vertical direction. When one pulley 94 or 95 is driven, for example, by a motor (not shown), the belt 93 can be rotated clockwise or counterclockwise, whereby the stack tray 90 can be moved up or down in the vertical direction. Here, the moving mechanism 91 is not limited to this structure but it is also possible to employ a well-known system structure.

Figure 9:
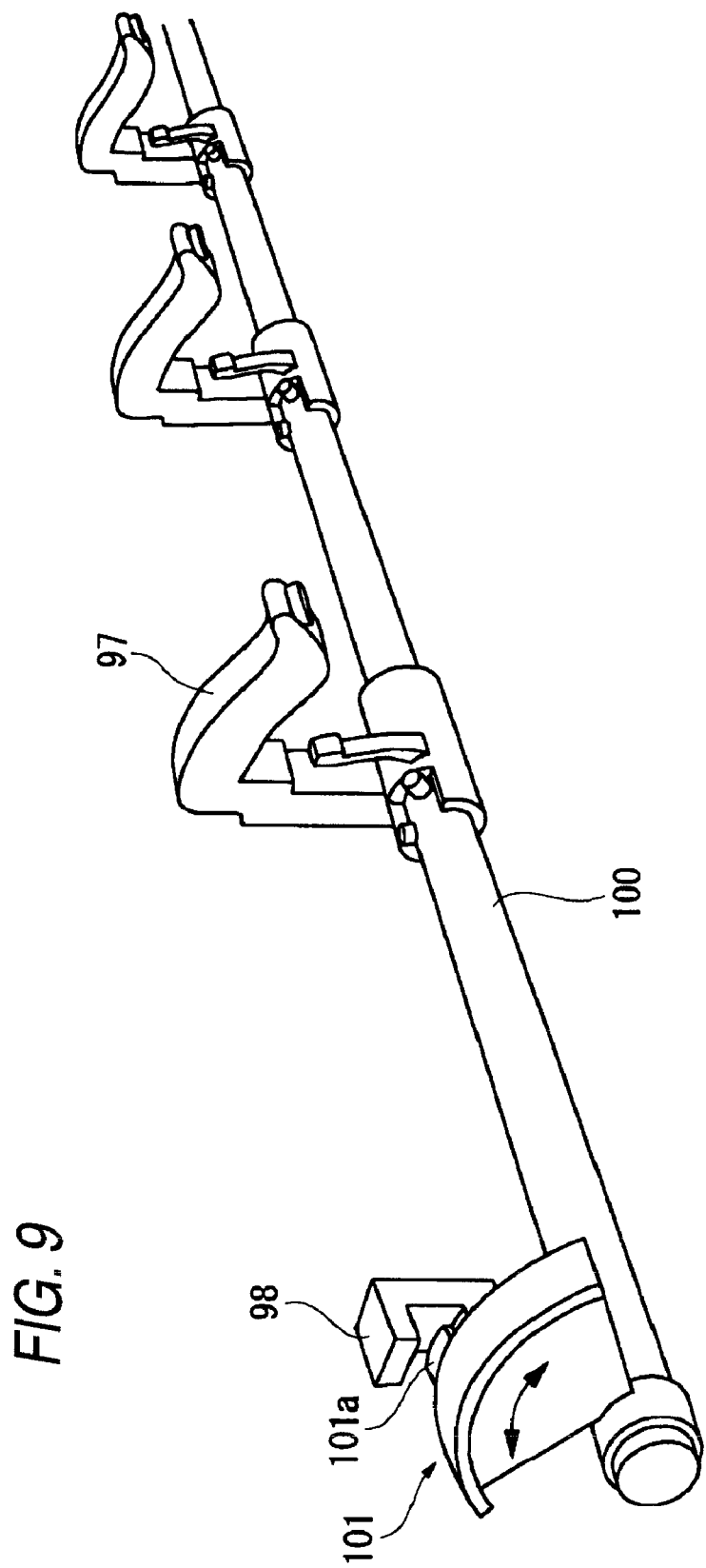
FIG. 9 is an explanatory view of a method for detecting the position of a stack tray.

On the other hand, as a method for detecting the position of the stack tray 90 in order to set the stack tray 90 at the ordinary storage position, as shown in FIG. 9, there is employed a method for detecting the moving angle of the set clamp 97 using the ordinary position detector 98. Therefore, a detect member 101 having a substantially fan-shaped vane is mounted on one end side of an oscillating shaft 100 on which the set clamp 97 (in the present embodiment, three set clamps are used) is positioned and supported, a portion of the detect member 101 is formed as a light blocking piece 101a, and the ordinary position detector 98 is disposed so as to correspond to a direction where the light blocking piece 101a is moved due to the oscillating motion of the oscillating shaft 100. As the ordinary position detector 98, for example, there is used a detector of a photo interrupter type; and, when the light blocking piece 101a of the detect member 101 crosses the ordinary position detector 98, the angle of the detect member 101 can be detected. Thus, by detecting a change point in the ordinary position detector 98 using the detect member 101, the attitude of the set clamp 97 can be detected. Here, although, as the ordinary position detector 98, there is illustrated a detector of an optical system, this is not limitative but there may also be employed a detector of an electric system or a detector of a magnetic system.

Figure 10:
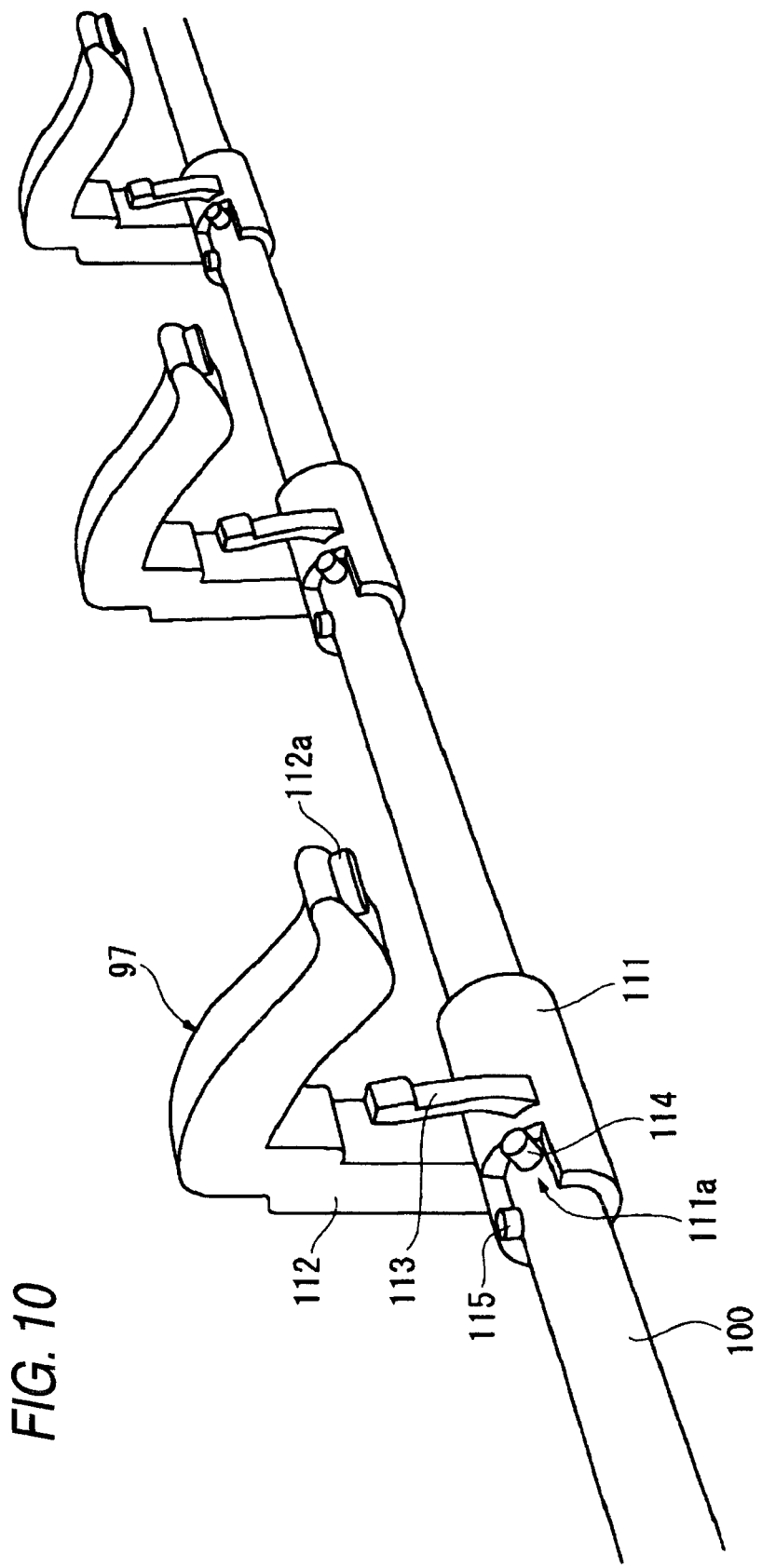
FIG. 10 is an explanatory view of a set clamp.

Also, the set clamp 97, as shown in FIG. 10, includes: a substantially cylindrical ring-shaped portion 111 into which the oscillating shaft 100 is inserted; an oscillating portion 112 which extends from a portion of the ring-shaped portion 111 in a direction intersecting with the oscillating shaft 100, rises upwardly and is then curved; and, a stopper portion 113 which, differently from the oscillating portion 112, rises up from the ring-shaped portion 111. The leading end 112a of the oscillating portion 112 can be contacted with the stack tray 90 or the surface of the record member stored in the stack tray 90. Also, since there is provided the stopper portion 113 and the stopper portion 113 can be contacted with the main body box body 61, the leading end 112a of the oscillating portion 112 can be prevented from pressing against the stack tray 90 or the record member on the stack tray 90 excessively. Further, in the ring-shaped portion 111, there is formed a cut 111a in the axial direction of the oscillating shaft 100, whereby the ring-shaped portion 111 is positioned by two projections 114 and 115 provided at two different positions in order to prevent the oscillating shaft 100 from idling. Owing to such structure of the set clamp 97, a position, where the change point of the ordinary position detector 98 is detected by the light blocking piece 101a of the detect member 101, can be regarded as the ordinary storage position.

According to the present exemplary embodiment, the ordinary storage position is set such that it is situated in the vicinity of the discharge rollers 63 (specifically, the lower roller member 63b); and, ordinary record members (such as paper which is used generally) are arranged on the arranging tray 73 and are then discharged therefrom and stored into the stack tray 90 which is held at the ordinary storage position. On the other hand, when the specific record members are transported as the record members, the specific storage position of the stack tray 90 is set at a position lower by dozens of mm than the ordinary storage position and, without positioning and storing the specific record members in the arranging tray 73, they are discharged and stored into the stack tray 90 which is held at the specific storage position.

Figure 11:
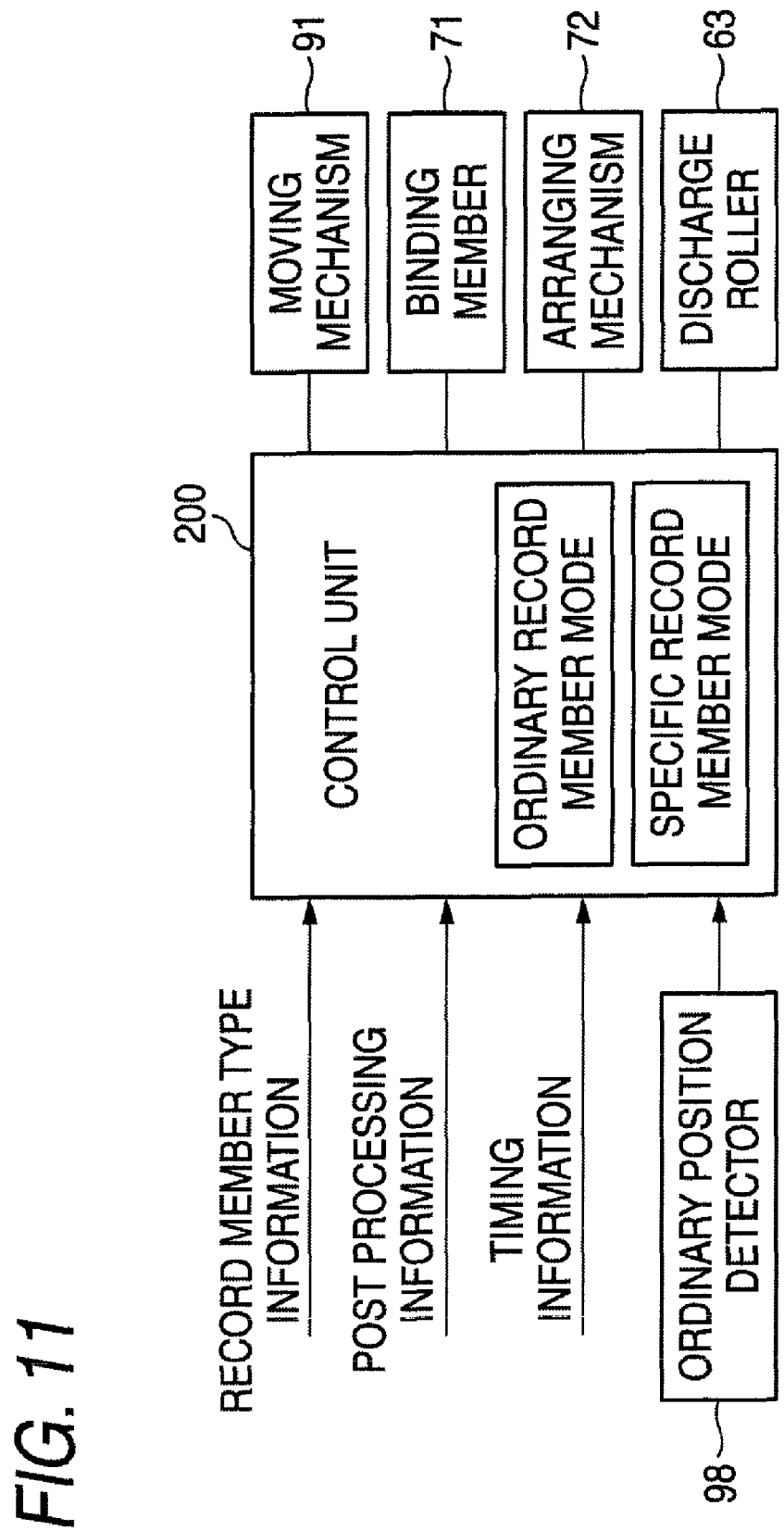
FIG. 11 is a block diagram of a control unit.

The control unit 200, which is used in the above-structured post processing apparatus 40, is structured to carry out various control operations as shown in a block diagram of FIG. 11.

Input information, which is to be input to the control unit 200, includes: record member type information telling whether a record member to be carried into the post processing apparatus 40 is an ordinary record member or a specific record member; post processing information telling whether a post processing should be carried out on the record member to be carried into the post processing apparatus 40; timing information necessary to match the timing of the operation of the post processing apparatus to that of the image forming apparatus 10; information from the ordinary position detector 98; and, other similar information. And, the control unit 200, according to these pieces of information, determines whether a record member to be carried in is an ordinary record member or a specific record member and, according to the determine results, carries out an ordinary record member mode or a specific record member mode. And, according to the execution mode, the control unit 200 controls the moving mechanism 91, binding member 71, arranging mechanism 72, discharge rollers 63 and the like. Further, as the input information of the control unit 200, there may also be input record member number (the number of a series of record members) information in one job.

Also, the record member type information according to the present exemplary embodiment is input by depressing a select button provided on an operation panel (not shown) disposed in the image forming apparatus 10 shown in FIG. 3 when the record member is the specific record member, and such input information is transmitted to the control unit 200 disposed in the post processing apparatus 40. However, this is not limitative but, for example, an instrument for measuring the thickness of the record member may also be provided in the ordinary transport route R1 on the side of the image forming apparatus 10 and, when information from the measuring instrument tells that the thickness of the record member is larger than a previously set thickness, it may be determined that the record member to be transported to the post processing apparatus 40 is a specific record member. Or, an instrument for measuring the thickness of the record member may also be provided, for example, in the horizontal transport route R3 of the post processing apparatus 40. Further, the image forming apparatus 10 may include multiple record supply portions 12, a portion of the multiple record supply portions 12 may be used as a portion to be used exclusively for the specific record member and, when a record member is supplied from such exclusive supply portion, the record member may be regarded as the specific record member. As such specific record member, for example, there are available an OHP sheet, an envelope, a postal card, fine quality paper having a basic weight of 135 gsm or more, and the like.

Figure 12:
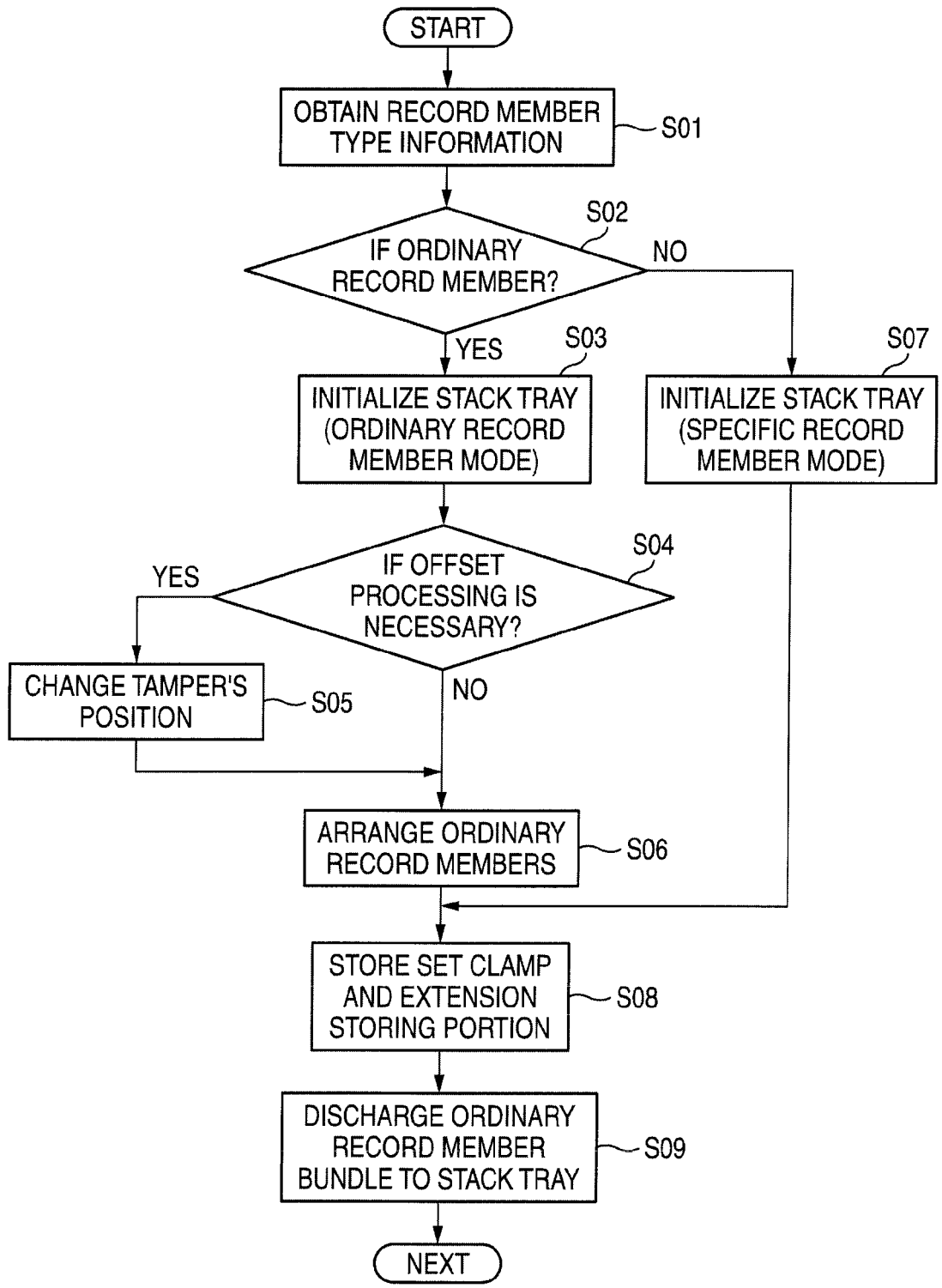
FIG. 12 is a flow chart of a control processing to be executed by the control unit.

Next, description will be given below of the specific operations of various mechanisms with reference to such a control flow as shown in FIG. 12.

Firstly, there is obtained information about the type of a record member to be carried into the post processing apparatus 40 (S01). And, from the thus obtained information, it is determined whether a record member to be carried in is an ordinary record member or a specific record member (S02). Here, when it is found that the record member is the ordinary record member, the stack tray 90 is initialized in ordinary record member mode (S03). In the initialization in the ordinary record member mode, after the set clamp 97 and extension storing portion 75 are advanced from the main body box body 61 toward the stack tray 91, when the stack tray 90 is raised up once, the set clamp 97 is raised up and thus the angle of the set clamp 97, that is, the position of the stack tray 90 is detected by the ordinary position detector 98; and, after then, the stack tray 90 is moved down by a given amount so that it can be held at the ordinary storage position. In this case, when the record member is stored on the stack tray 90, the stack tray 90 is moved so that the position of the top surface of the upper-most record member can provide the ordinary storage position. And, in a state where the record member is stored on the stack tray 90, the record member cannot be always stored over the whole of the upper surface of the stack tray 90. Therefore, according to the present embodiment, three set clamps 97 are disposed at their respective three positions and, when any one of the set clamps 97 is contacted with the record member, the ordinary storage position can be set.

Next, it is determined whether it is necessary to move such direction of the record member as intersecting with the discharge direction thereof before the record member is discharged to the stack tray 90, or not (that is, it is determined whether it is necessary to carry out a so called offset processing on the record member or not) (S04). If found necessary, the position of the tamper is changed (the position of one of paired tampers 74, for example, the position of the tamper 74 serving as the reference is changed to the reference position) (S05). And, a given number of ordinary record members are superimposed on top of each other on the arranging tray 73 and extension storing portion 75 and are then arranged (S06). In this case, for the ordinary record members, they are positioned one by one on the arranging tray 73 and extension storing portion 75 by the first and second paddles 76 and 77 and, at the then time, the record members are arranged one by one in the width direction thereof by the tampers 74, whereby bundles each including a given number of record members can be arranged along the tamper 74 serving as the reference.

After then, the set clamp 97 and extension storing portion 75 are respectively stored in order that they are prevented from interfering with the storing operation of the ordinary record members in the stack tray 90 (S08). The ordinary record member bundles arranged by the discharge rollers 63 nipping at these bundles are discharged onto the stack tray 90 (S09). On the other hand, when an end binding processing as a post processing is executed on the ordinary record member bundles arranged on the arranging tray 73, the ordinary record member bundles just arranged on the arranging tray 73 may be bound as they are by the binding member 71 and, after then, they may be discharged to the stack tray 90.

Also, when, in Step S02, it is found that the record member to be carried in is not the ordinary record member but the specific record member, the stack tray 90 is initialized in specific record member mode (S07). To initialize the stack tray 90 in the specific record member mode, after the set clamp 97 and extension storing portion 75 are advanced from the main body box body 61, the stack tray 90 may be raised up once and thus the set clamp 97 may be raised up to thereby allow the normal position detector 98 to execute its detecting operation; and, after then, in order that the stack tray 90 can take the specific storage position, the stack tray 90 may be moved down to a position which is further lower by a given amount than the ordinary storage position. And, for the specific record members, the processing advances as it is to Step S08, where the specific record members are discharged to the stack tray 90. Here, in the present embodiment, there is illustrated a structure in which, in the initialization, the extension storing portion 75 is also advanced; however, there may also be employed a structure in which the extension storing portion 75 is not advanced.

Now, description will be given below of the relationship between the record member type and the distance (height) from the discharge position of the stack tray 90 when discharging and storing the record members into the stack tray 90 in the above-structured post processing apparatus 40.

When discharging the ordinary record members to the stack tray 90, the record members arranged by the arranging tray 73 may be discharged as they are to the stack tray 90 without breaking the bundles of the record members. For this purpose, the height of the stack tray 90 may be set near to the discharge position of the record members that are discharged from the discharge rollers 63. However, when stack tray 90 is situated near to the discharge position in this manner, there is raised a problem when using the specific record member such as an envelope and a postal card which can be curled greatly when forming images thereon: that is, when discharging the specific record member to the stack tray 90, the trailing end of the specific record member cannot fall down onto the stack tray 90 completely but can cover the exit from the discharge rollers 63.

In this case, normally, the specific record member, on which no post processing is executed, that is, which is not positioned and stored in the arranging tray 73, is discharged and stored into a storage tray separately provided from the stack tray 90. However, when the record member storing portion is only the stack tray 90, the record members is stored according to the properties of the respective record members. According to the present exemplary embodiment, in order to cope with this, the height of the stack tray 90 from the discharge position is switched between the ordinary storage position and specific storage position according to the types of the record members used.

Figure 13A:
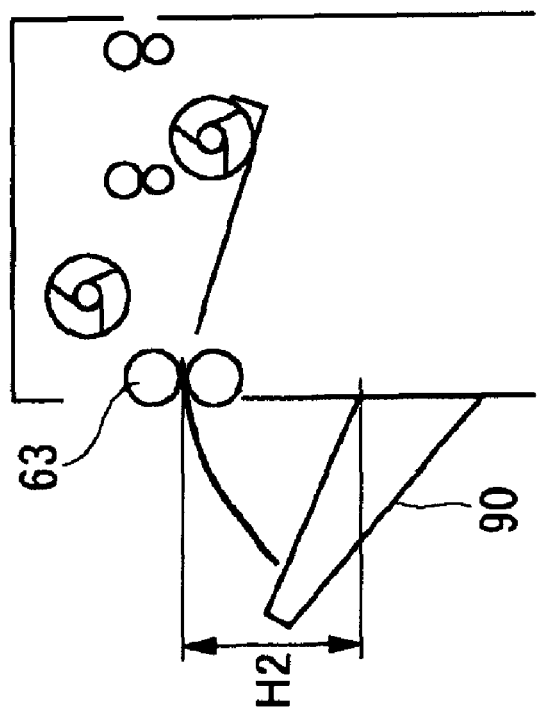
FIG. 13A is an explanatory view of a state where a curled specific record member is discharged to the stack tray as a comparison example in which a stack tray is held at an ordinary storage position.
Figure 13B:
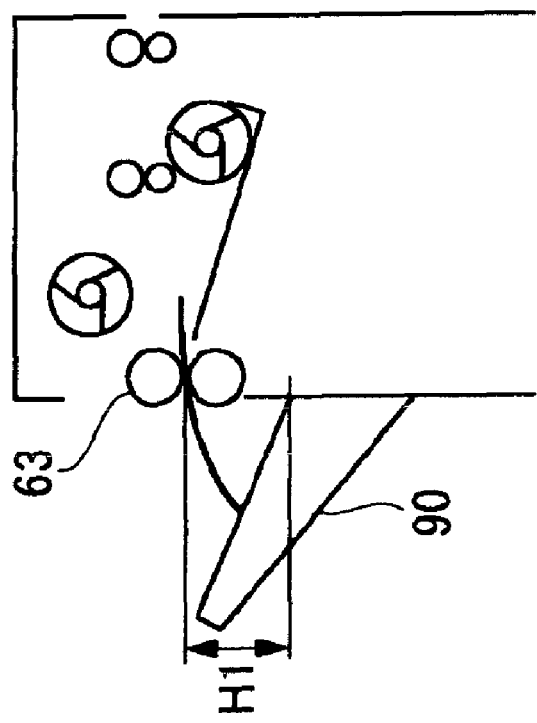
FIG. 13B is an explanatory view of a state where a curled specific record member is discharged to the stack tray as a case like the present exemplary embodiment in which the stack tray is held at a specific storage position sufficiently lower than the ordinary storage position.

FIGS. 13A and 13B respectively show a state where, when the specific record member is a curled record member, the height from the discharge position of the stack tray 90 is changed. Specifically, FIG. 13A shows a state where the height is the ordinary storage position (the height is H1); whereas FIG. 13B shows a state where the height is the specific storage position (the height is H2). When trying to discharge such specific record member to the stack tray 90 held at the ordinary storage position, as shown in FIG. 13A, the leading end of the record member is butted against the stack tray 90 and thus a transport force by the discharge rollers 63 is applied thereto further, whereby the record member can be deformed or the trailing end of the record member discharged can cover the discharge position. According to the present exemplary embodiment, as shown in FIG. 13B, since the stack tray 90 is held at the specific storage position and thus it is held at a position (the height is H2) sufficiently lower than the ordinary storage position, even the curled record member can be made to fall down onto the stack tray 90 easily, whereby the record members can be properly superimposed on top of each other and arranged on the stack tray 90.

And, also when the specific record member is curled in the opposite direction to the direction shown in FIGS. 13A and 13B (that is, the specific record member provides a downwardly projecting shape, with use of the ordinary storage position (the height is H1), the record member discharged onto the stack tray 90 can also cover the discharge position of the discharge roller 63, so that the record member cannot be stored onto the stack tray 90 properly.

In other words, since an ordinary record member such as paper is light in dead weight, the fall height (which corresponds to H1) from the discharge position is set small; and also, multiple ordinary record members are put together into a bundle to make the dead weight thereof heavy before they are discharged. Further, for the ordinary record member, sometimes, a large number of record members are printed; and, in this case, there is a fear that, unless they are put in order on the stack tray 90, the attitude of the ordinary record members can be out of order when a large amount of record members are superimposed on top of each other on the stack tray 90. On the other hand, for the specific record member such as an envelope, a postal card, a cardboard and an OHP sheet, the record member itself is heavier in weight than paper and thus, even when the distance from the discharge position to the stack tray 90 is set for the fall height (which corresponds to H2), there is raised only a small fear that the record members can break up separately. Also, the specific record members, generally, are not printed in a large lot but, in most cases, they are printed in a small lot. Therefore, even when they are not superimposed on top of each other properly on the stack tray 90, there is no fear that they can break up.

Accordingly, for the ordinary record members, after the record members are arranged properly, the ordinary storage position is set at a position near to the discharge position of the discharge roller 63 and the record member bundle arranged is discharged as it is toward the stack tray 90. On the other hand, for the specific record members, with the attitude thereof taken into consideration, they are discharged as they are at the specific storage position toward the stack tray 90 without taking time and labor to arrange them. Owing to this, whether the record members are the ordinary record members or specific record members, they can be stored properly on one stack tray 90.

Next, description will be given below of the motion of a record member in each of specific modes with reference to the accompanying drawings.

FIGS. 14A~14F respectively show a state where three ordinary record members are arranged and discharged and stored into the stack tray 90 in ordinary record member mode. When a first record member S1 is carried into the post processing main body portion 60 of the post processing apparatus 40, as shown in FIG. 14A, the first record member S1 is transported by transport rollers 62. The thus transported record member S1, as shown in FIG. 14B, is switched back and is then moved onto the arranging tray 73 due to the lowering movement of the first paddle 76; and, as shown in FIG. 14C, the record member S1 is arranged on the arranging tray 73 together with the second paddle 77 with the rear end as the reference (here, at the then time, the width-direction portion of the record member S1 is also arranged by a tamper (not shown). And, as the first paddle 76 rises, a second record member S2 is also transported by the transport rollers 62. The second record member S2, as shown in FIG. 14D, is also moved onto the arranging tray 73. When such operations are carried out repeatedly, as shown in FIG. 14E, the three record members S1, S2 and S3 are arranged on the arranging tray 73. Next, as shown in FIG. 14F, the bundle of the thus arranged three record members is nipped by the discharge rollers 63 and is discharged onto the stack tray 90. Thus, on the stack tray 90, the arranged record member bundle is stored as it is.

Figure 15A:
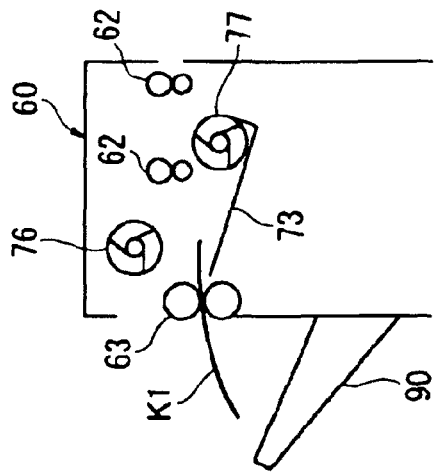
FIGS. 15A~15F are respectively explanatory views of states in which a specific record member is discharged to the stack tray.
Figure 15B:
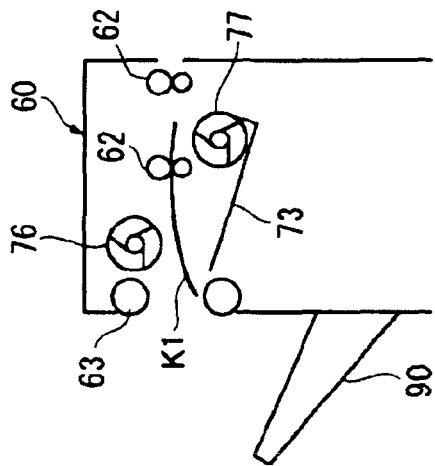
Figure 15C:
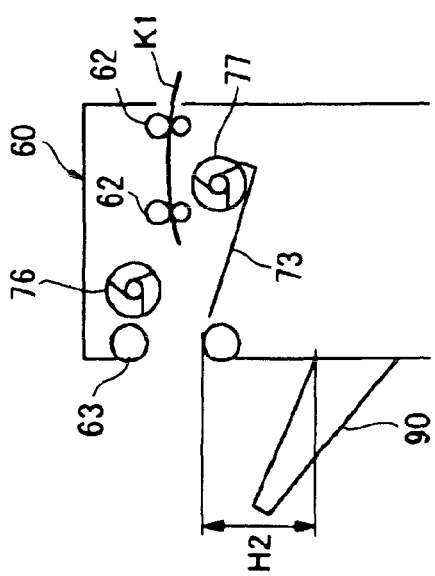
Figure 15D:
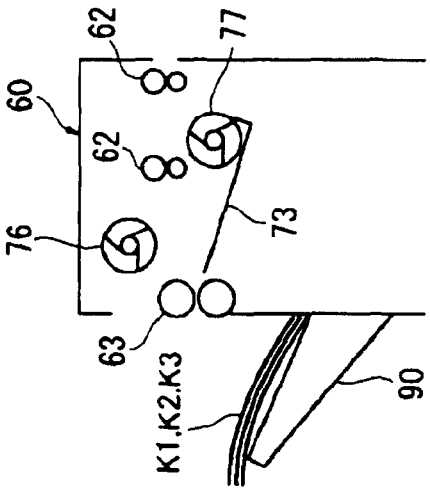
Figure 15E:
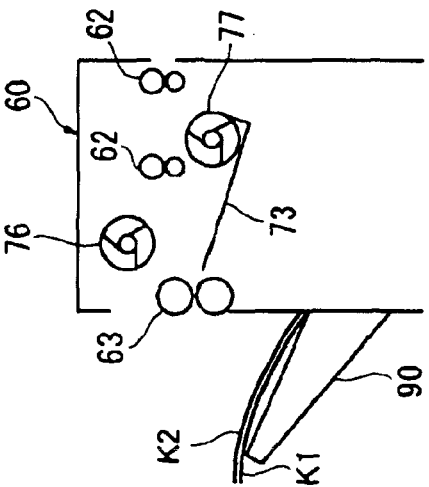
Figure 15F:
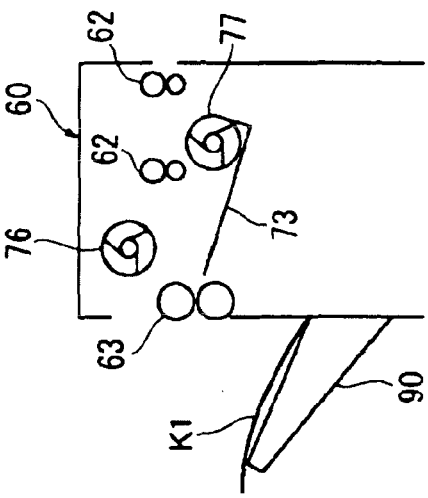

On the other hand, FIGS. 15A~15F respectively show a state where three specific record members are discharged and stored into the stack tray 90 in specific record member mode. For example, a specific record member such as an envelope, in a state where it is carried from the image forming apparatus 10 into the post processing main body portion 60, is generally curled when compared with an ordinary record member such as paper. Because of this, the stack tray 90 is set at a specific storage position lower than such ordinary storage position as shown in FIGS. 14A-14F. When a first record member K1 is carried into the post processing main body portion 60, as shown in FIG. 15A, the record member K1 is transported by the transport rollers 62. Here, as shown in FIG. 15B, while the first paddle 76 stands as it is, the conveyance of the record member K1 is continued; and, as shown in FIG. 15C, the discharge rollers 63 transport the record member K1 while nipping at it, whereby, as shown in FIG. 15D, the record member K1 is discharged and stored as it is into the stack tray 90. Similarly, as shown in FIG. 15E, a second record member K2 is discharged onto the stack tray 90 and, as shown in FIG. 15F, a third record member K3 is also discharged onto the stack tray 90. In other words, for the specific record member, the arranging mechanism 72 is prevented from functioning and thus the record members K1~K3 are not arranged on the arranging tray 73. Here, the discharge rollers 63 may also be structured such that, when they nip at the specific record members once, they will maintain the nipping state while the specific record members are being used.

According to the present exemplary embodiment, there is illustrated a structure which includes a single specific storage position. However, according to the invention, there may also be employed another structure. For example, by taking into account the transport lengths of the record members (for example, the transport lengths of specific record members such as an envelope and a postal card), there may also be provided multiple specific storage positions. In this case, the storage position of a record member having a longer transport length may be set at a position lower than that of a record member having a shorter transport length. Further, by ramifying the specific record members according to the thicknesses thereof, specific storage positions may also be set according to the ramified record members.

And, according to the present exemplary embodiment, there is illustrated a structure in which, for the ordinary record members, after they are arranged on the arranging tray 73, they are discharged onto the stack tray 90. However, according to the invention, there may also be employed another structure. For example, there may also be employed a structure in which, in ordinary record member mode, there is further obtained information about the number of record members to be used in one job and, when the number is small, the record members are not arranged but are discharged directly to the stack tray 90 held at the ordinary storage position. In this case, although the number of record members to be selected may be any number, for example, when it is equal to several numbers or less, the time for arranging the record members can be saved and thus the record members can be discharged to the stack tray 90 quickly.

According to the present exemplary embodiment, there is illustrated a method in which a specific record member can be selected using an operation panel (not shown) provided in the image forming apparatus 10. However, according to the invention, there may also be employed another method. For example, When a fixing condition in the fixing device 16 of the image forming apparatus 10 is different from the condition of an ordinary record member which is used ordinarily, it may be determined that the record member to be used is a specific record member. In this case, when the record member is larger, for example, in thickness than the ordinary record member, the fixing condition provides a stronger heating condition, which can facilitate the generation of curling in the record member, thereby being able to transport the record member more properly.

Exemplary Embodiment 2

Figure 16:
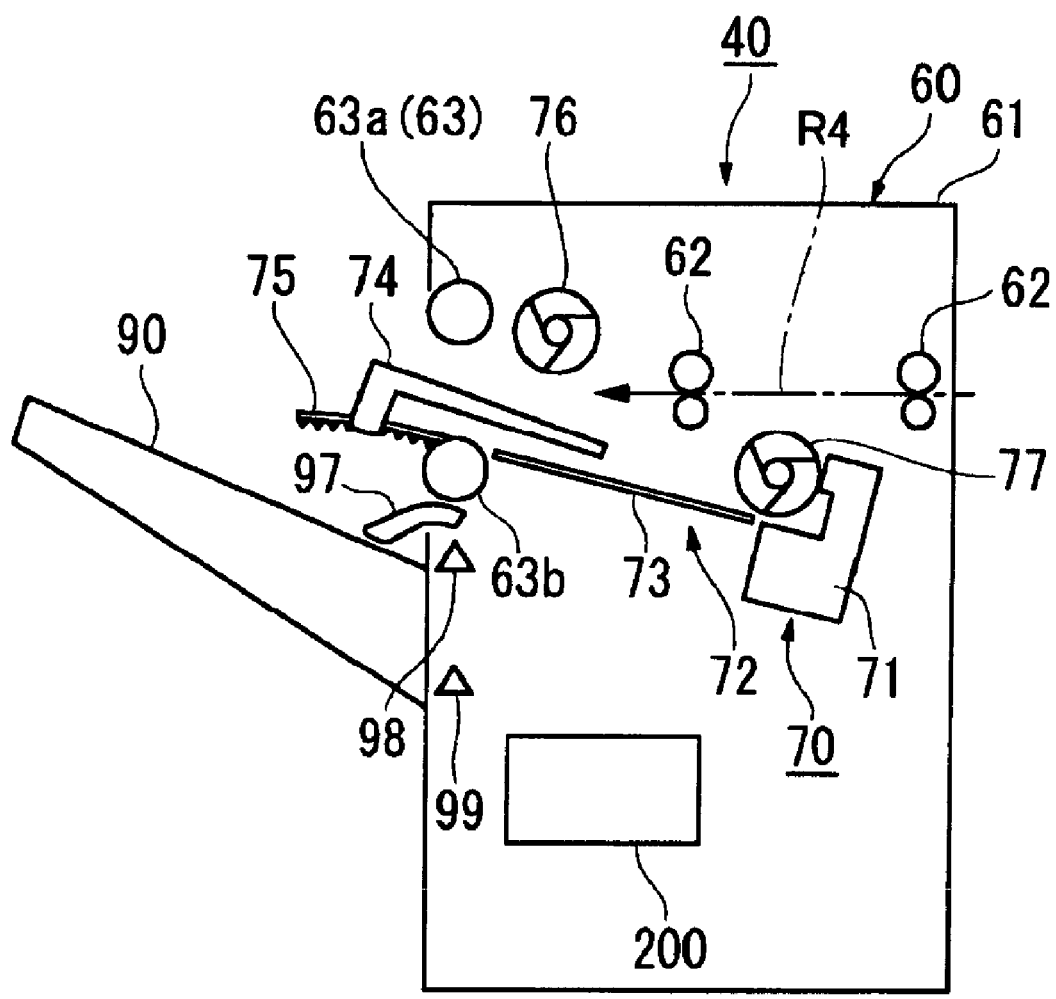
FIG. 16 is an explanatory view of the summary of the post processing main body portion of a record member processing apparatus according to an exemplary embodiment 2.

FIG. 16 shows a post processing main body portion 60 according to an exemplary embodiment 2 of a record member processing apparatus to which the above-mentioned exemplary embodiment model is applied. Specifically, the present post processing main body portion 60 includes the post processing main body portion 60 according to the exemplary embodiment 1 and further a specific position detector 99 for adjusting a storage position for a specific record member. Here, similar composing elements to those in the exemplary embodiment 1 are given the same designations and thus the detailed description thereof is omitted here.

As shown in FIG. 16, according to the present exemplary embodiment, downwardly of the ordinary position detector 98 for detecting the ordinary storage position, there is newly disposed a specific position detector 99 for adjusting a storage position for a specific record member. As the specific position detector 99, for example, there is used a detector of a reflection type, while the reflection type detector is structured such that it can detect the position of the upper surface of the stack tray 90 or the position of the top surface of the upper-most record member on the stack tray 90.

And, according to the present exemplary embodiment, the specific position detector 99 is disposed at a position where, when the stack tray 90 with no record member stored thereon is held at the ordinary storage position, the specific position detector 99 can be covered with the stack tray 90. Therefore, while an ordinary record member is being stored on the stack tray 90, no change point can be detected as information from the specific position detector 99 and, further, when two or more record members are superimposed and stored on the stack tray 90, these record members prevent the change point from being detected. In other words, according to the present exemplary embodiment, since a detector of a reflection type is used as the specific position detector 99, when the stack tray 90 with no record member stored thereon is held at the ordinary storage position, or when the record members are stored on the stack tray 90 and the top surface of the upper-most record member exists at the ordinary storage position, the specific position detector 99 is prevented from turning on. Therefore, since no change is caused in the specific position detector 99, the vertical movement control of the stack tray 90 can be carried out only by the ordinary position detector 98 disposed upwardly of the specific position detector 99.

On the other hand, when the stack tray 90 is moved downward and the specific position detector 99 is situated upwardly of the stack tray 90, the height of the stack tray 90 can be adjusted directly by the specific position detector 99. In this case, there is eliminated the need for the adjustment to be made by the set clamp 97. For example, the specific storage position can be set in the vicinity of the specific position detector 99. This can also eliminate the need to drive the moving mechanism 91 unnecessarily.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A storing and processing apparatus for a record member, comprising:
   a record member transport route that transports a recording member;

a record member storing portion that stores therein the record member being transported along the record member transport route;

a moving unit that moves the record member storing portion up or down;

a positioning and storing portion that temporarily positions and stores the record member being transported along the record member transport route before being stored by the record member storing portion;

an arranging unit that stacks and arranges record members in the positioning and storing portion;

a discharge member that discharges the record member on the record member transport route or on the positioning and storing portion from a discharge position toward the record member storing portion;

a record member type determining unit that determines whether a record member being transported along the record member transport route is an ordinary record member having a weight or a thickness of a reference value or less, or a specific record member having a weight or a thickness of a value exceeding the reference value; and, a control unit which, when the record member type determining unit determines that the record member is the ordinary record member, drives the moving unit to move the record member storing portion up or down to be set at an ordinary storage position which is lower than the discharge position of the record member to be discharged by the discharge member, and drives the discharge member to discharge one or more record members arranged on the positioning and storing portion toward the record member storing portion after the one or more record members are arranged in the positioning and storing portion by the arranging unit, whereas, when the record member type determining unit determines that the record member is the specific record member, the control unit drives the moving unit to move the record member storing portion up or down to be set at a specific storage position which is lower than the ordinary storage position and thereafter drives the discharge member to discharge the record members being transported along the record member transport route toward the record member storing portion without storing the record member in the positioning and storing portion.

2. The storing and processing apparatus for the record member according to claim 1, wherein the control unit includes an ordinary position detector capable of detecting the ordinary storage position and sets to move up or down the ordinary storage position of the record member storing portion according to information from the ordinary position detector.

3. The storing and processing apparatus for the record member according to claim 2, wherein the ordinary position detector includes:

a hold member that holds down the record member storing portion being set at the ordinary storage position or the record member stored in the record member storing portion; and a detecting portion that detects an attitude of the hold member.

4. The storing and processing apparatus for the record member according to claim 2, wherein the control unit further includes a specific position detector for detecting the specific storage position, and the information from the ordinary position detector has a priority over information from the specific position detector.

5. The storing and processing apparatus for the record member according to claim 1, wherein the arranging unit includes a pair of arranging members that taps end faces of the record members existing on the positioning and storing portion in a width direction thereof intersecting with a transport direction of the record members to thereby arrange the record members, and the pair of arranging members are structured such that one arranging member is used as a reference position in the width direction and the arranging member serving as the reference is switched, whereby the record members on the positioning and storing portion is arranged at different offset positions along the width direction thereof.

6. The storing and processing apparatus for the record member according to claim 1, wherein the arranging unit includes an extension storing portion that, when arranging the record members, advances toward the record member storing portion to position and store the record members together with the positioning and storing portion.

7. A post processing apparatus, comprising:

a storing and processing apparatus for the record member according to claim 1; and, a post processing portion disposed correspondingly to the record member transport route or the storing and processing apparatus that executes a post processing on one or more record members being transported along the record member transport route.

8. A processing apparatus for the record member, comprising:

an image forming apparatus including an image forming portion that forms an image on a record member; and, a post processing apparatus according to claim 7.

9. The processing apparatus for the record member according to claim 8, wherein the image forming portion includes a fixing device that fixes the record member by heating, and the record member type determining unit determines that, when a fixing condition of the fixing device is different from a condition of an ordinary record member used ordinarily, a record member is a specific record member.

10. A storing and processing apparatus for a record member, comprising:

a record member transport route that transports a recording member;

a record member storing portion that stores therein the record member being transported along the record member transport route;

a moving unit that moves the record member storing portion up or down;

a positioning and storing portion that temporarily positions and stores the record member being transported along the record member transport route before being stored by the record member storing portion;

an arranging unit that stacks and arranges record members in the positioning and storing portion;

a discharge member that discharges the record member on the record member transport route or on the positioning and storing portion from a discharge position toward the record member storing portion;

a record member type determining unit that determines whether a record member being transported along the record member transport route is an ordinary record member having a weight or a thickness of a reference value or less, or a specific record member having a weight or a thickness of a value exceeding the reference value; and, a control unit which, when the record member type determining unit determines that the record member is the ordinary record member, drives the moving unit to move the record member storing portion up or down to be set at an ordinary storage position which is lower than the discharge position of the record member to be discharged by the discharge member, and when a number of ordinary record members being transported in series along the record member transport route is a predetermined number or more, the control unit drives the discharge member to discharge one or more record members arranged on the positioning and storing portion toward the record member storing portion after the one or more record members are arranged in the positioning and storing portion by the arranging unit, and when the number is less than the predetermined number, the control unit drives the discharge member to discharge the one or more record members being transported along the record member transport route toward the record member storing portion without storing the record member in the positioning and storing portion, whereas, when the record member type determining unit determines that the record member is the specific record member, the control unit drives the moving unit to move the record member storing portion up or down to be set at a specific storage position which is lower than the ordinary storage position and thereafter drives the discharge member to discharge the record members being transported along the record member transport route toward the record member storing portion without storing the record member in the positioning and storing portion.

\* \* \* \* \*